US012096363B2

(12) United States Patent
Zhou et al.

(10) Patent No.: US 12,096,363 B2
(45) Date of Patent: *Sep. 17, 2024

(54) ADAPTIVE TRANSMISSIONS OF WAKEUP RADIO SYNCHRONIZATION BEACONS

(71) Applicant: QUALCOMM Incorporated, San Diego, CA (US)

(72) Inventors: Yan Zhou, San Diego, CA (US); Yanjun Sun, San Diego, CA (US); Alfred Asterjadhi, San Diego, CA (US); George Cherian, San Diego, CA (US); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,643

(22) Filed: Sep. 8, 2021

(65) Prior Publication Data

US 2021/0410068 A1    Dec. 30, 2021

Related U.S. Application Data

(63) Continuation of application No. 15/898,938, filed on Feb. 19, 2018, now Pat. No. 11,147,015.

(Continued)

(51) Int. Cl.
*H04W 52/02*    (2009.01)
*H04W 56/00*    (2009.01)
*H04W 84/12*    (2009.01)

(52) U.S. Cl.
CPC ... *H04W 52/0229* (2013.01); *H04W 52/0206* (2013.01); *H04W 52/0216* (2013.01);
(Continued)

(58) Field of Classification Search
CPC ............ H04W 52/02; H04W 52/0203; H04W 52/0206; H04W 52/0209; H04W 52/0212;
(Continued)

(56) References Cited

U.S. PATENT DOCUMENTS 9,301,266 B2    3/2016 Sampath et al.
2008/0056169 A1    3/2008 Pattabiraman et al.
(Continued)

FOREIGN PATENT DOCUMENTS

| CN | 104365164 A | 2/2015 |
| KR | 20140136009 A | 11/2014 |
| WO | WO2013028629 | 2/2013 |

OTHER PUBLICATIONS

International Search Report and Written Opinion—PCT/US2018/018761—ISA/EPO—dated Jun. 14, 2018.
(Continued)

*Primary Examiner* — Peter Chen
(74) *Attorney, Agent, or Firm* — Holland & Hart LLP

(57) ABSTRACT

Methods, systems, and apparatuses for wireless communications are described. Stations operating within a system may have a primary radio and a wakeup or low-power radio. Access points (APs) may send indications receivable by the wakeup radio to alert a station of a pending data transmission for the station. APs may transmit synchronization beacons for wakeup radios of the stations, and the transmission timing for the synchronization beacons may be adapted based on operating conditions of one or more stations. For example, an AP may skip transmissions of a synchronization beacon or may adapt the frequency of synchronization beacon transmissions based on various operating conditions or factors. Stations may report certain information about operating conditions or capabilities that may be used to adapt synchronization beacon transmissions.

30 Claims, 17 Drawing Sheets

Related U.S. Application Data

(60) Provisional application No. 62/463,554, filed on Feb. 24, 2017.

(52) U.S. Cl.
CPC ... *H04W 52/0225* (2013.01); *H04W 56/0015* (2013.01); *H04W 84/12* (2013.01); *Y02D 30/70* (2020.08)

(58) Field of Classification Search
CPC ......... H04W 52/0216; H04W 52/0225; H04W 52/0229; H04W 56/001; H04W 56/0015; H04W 8/005; H04W 40/244; H04W 88/02; H04W 84/12; H04W 84/18
See application file for complete search history.

(56) References Cited

U.S. PATENT DOCUMENTS

| | | |
|---|---|---|
| 2014/0204822 A1 | 7/2014 | Park et al. |
| 2015/0319555 A1 | 11/2015 | Cordeiro et al. |
| 2015/0365155 A1 | 12/2015 | Subramanian et al. |
| 2016/0150474 A1 | 5/2016 | Ang et al. |
| 2018/0249412 A1 | 8/2018 | Zhou et al. |
| 2019/0253973 A1 | 8/2019 | Li et al. |
| 2019/0289549 A1 | 9/2019 | Lim et al. |
| 2019/0327672 A1 | 10/2019 | Hwang et al. |

OTHER PUBLICATIONS

Partial International Search Report—PCT/US2018/018761—ISA/EPO—dated Apr. 17, 2018.

ADAPTIVE TRANSMISSIONS OF WAKEUP RADIO SYNCHRONIZATION BEACONS

CROSS REFERENCES

The present application for patent is a Continuation of U.S. patent application Ser. No. 15/898,938 by Zhou et al., now issued as U.S. Pat. No. 11,147,015, entitled "Adaptive Transmissions Of Wakeup Radio Synchronization Beacons" filed Feb. 19, 2018, which claims priority to U.S. Provisional Patent Application No. 62/463,554 by Zhou et al., entitled "Adaptive Transmissions of Wakeup Radio Synchronization Beacons," filed Feb. 24, 2017, assigned to the assignee hereof, and is hereby expressly incorporated by reference herein in its entirety.

BACKGROUND

The following relates generally to wireless communications and more specifically to adaptive transmissions of wakeup radio synchronization beacons.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink (DL) and uplink (UL). The DL (or forward link) may refer to the communication link from the AP to the STA, and the UL (or reverse link) may refer to the communication link from the STA to the AP.

STAs may power down portions of a receiver at various times to conserve battery power. APs may operate without regard to a particular operating condition or capability of a given STA, including whether a STA has powered down or will power down some components. This may decrease the efficiency of medium use or other resources within a system.

SUMMARY

The described techniques relate to improved methods, systems, devices, or apparatuses that support adaptive transmissions of synchronization beacons, such as those associated with a low-power, wakeup radio (WUR), in a wireless local area network (WLAN). Stations (STAs) may be equipped with a low-power WUR to improve power efficiency and latency for communication in a WLAN. Similarly, access points (APs) in the WLAN may be equipped with their own low-power WUR. An AP may have pending downlink (DL) data for a STA. The STA may be in a low-power mode (e.g., where a main or primary radio of the STA is powered down), and the STA may monitor for and receive signals using the low-power WUR.

Prior to the AP transmitting the pending DL data to the STA, the AP may signal the STA to activate the main or primary radio. Transmission of the synchronization beacons however, in some cases, may have an extensive duration in which it occupies a communication medium, due to a low data rate. As a result, transmission of the synchronization beacon may reduce availability of the communication medium in the WLAN. In some cases, to improve the availability of the communication medium, an AP, for example, may skip transmitting a synchronization beacon to a STA. Alternatively, the AP may adapt a transmission frequency of the synchronization beacon to increase availability of a communication medium in the WLAN.

A method of for wireless communications is described. The method may include identifying an operating condition of a station that comprises a primary radio and a wakeup radio, adapting a transmission timing of a synchronization beacon associated with the wakeup radio of the station based at least in part on the identified operating condition, and transmitting the synchronization beacon according to the adapted transmission timing.

An apparatus for wireless communications is described. The apparatus may include means for identifying an operating condition of a station that comprises a primary radio and a wakeup radio, means for adapting a transmission timing of a synchronization beacon associated with the wakeup radio of the station based at least in part on the identified operating condition, and means for transmitting the synchronization beacon according to the adapted transmission timing.

Another apparatus for wireless communications is described. The apparatus may include a processor, memory in electronic communication with the processor, and instructions stored in the memory. The instructions may be operable to cause the processor to identify an operating condition of a station that comprises a primary radio and a wakeup radio, adapt a transmission timing of a synchronization beacon associated with the wakeup radio of the station based at least in part on the identified operating condition, and transmit the synchronization beacon according to the adapted transmission timing.

A non-transitory computer readable medium for wireless communications is described. The non-transitory computer-readable medium may include instructions operable to cause a processor to identify an operating condition of a station that comprises a primary radio and a wakeup radio, adapt a transmission timing of a synchronization beacon associated with the wakeup radio of the station based at least in part on the identified operating condition, and transmit the synchronization beacon according to the adapted transmission timing.

Some examples of the method, apparatus, and non-transitory computer-readable medium described herein may further include processes, features, means, or instructions for refraining from transmitting one or more instances of the synchronization beacon based at least in part on the identified operating condition. Some examples of the method, apparatus, and non-transitory computer-readable medium described herein may further include processes, features, means, or instructions for receiving a wakeup radio capability indication from the station, wherein the operation condition of the station may be identified based at least in part on receiving the wakeup radio capability. Some examples of the method, apparatus, and non-transitory computer-readable medium described herein may further include processes, features, means, or instructions for receiving, from the station, an association request message comprising the wakeup radio capability indication.

Some examples of the method, apparatus, and non-transitory computer-readable medium described herein may further include processes, features, means, or instructions for receiving a wakeup radio mode indication from the station, wherein the operating condition of the station may be identified based at least in part on the wakeup radio mode indication. Some examples of the method, apparatus, and non-transitory computer-readable medium described herein may further include processes, features, means, or instructions for determining that the station may be in a wakeup radio mode based at least in part on the received wakeup radio mode indication, wherein the transmission timing of a synchronization beacon may be adapted based at least in part on determining that the station may be in the wakeup radio mode. In some cases, the transmission timing may include a periodic transmission pattern, the periodic transmission pattern including one or more transmission times separated by a beacon period. Some examples of the method, apparatus, and non-transitory computer-readable medium described herein may further include processes, features, means, or instructions for receiving the wakeup radio mode indication in an action frame or a high efficiency (HE) control field of a data frame, or both, from the station.

Some examples of the method, apparatus, and non-transitory computer-readable medium described herein may further include processes, features, means, or instructions for determining that data traffic for the station comprises delay sensitive data traffic. Some examples of the method, apparatus, and non-transitory computer-readable medium described herein may further include processes, features, means, or instructions for determining that the station withdrew from a wakeup radio mode based at least in part on determining that the data traffic for the station comprises delay sensitive data traffic.

Some examples of the method, apparatus, and non-transitory computer-readable medium described herein may further include processes, features, means, or instructions for receiving a power status indicator from the station. Some examples of the method, apparatus, and non-transitory computer-readable medium described herein may further include processes, features, means, or instructions for determining that the station withdrew from a wakeup radio mode based at least in part on the received power status indicator.

Some examples of the method, apparatus, and non-transitory computer-readable medium described herein may further include processes, features, means, or instructions for identifying a periodic data traffic pattern associated with the station. Some examples of the method, apparatus, and non-transitory computer-readable medium described herein may further include processes, features, means, or instructions for comparing the periodic data traffic pattern to a synchronization beacon transmission interval. Some examples of the method, apparatus, and non-transitory computer-readable medium described herein may further include processes, features, means, or instructions for determining that the periodic data traffic pattern satisfies a threshold value associated with a wakeup mode of the station. Some examples of the method, apparatus, and non-transitory computer-readable medium described herein may further include processes, features, means, or instructions for refraining from transmitting one or more instances of the synchronization beacon based at least in part on determining that the periodic data traffic pattern satisfying the threshold value.

Some examples of the method, apparatus, and non-transitory computer-readable medium described herein may further include processes, features, means, or instructions for determining that the wakeup radio of the station may be in an active status. Some examples of the method, apparatus, and non-transitory computer-readable medium described herein may further include processes, features, means, or instructions for refraining from transmitting one or more instances of the synchronization beacon based at least in part on determining that that the wakeup radio of the station may be in the active status. In some examples of the method, apparatus, and non-transitory computer-readable medium described herein, the synchronization beacon comprises a time synchronization function (TSF).

Some examples of the method, apparatus, and non-transitory computer-readable medium described herein may further include processes, features, means, or instructions for identifying a clock drift of the station. Some examples of the method, apparatus, and non-transitory computer-readable medium described herein may further include processes, features, means, or instructions for adapting the transmission timing of the synchronization beacon based at least in part on the identified clock drift.

Some examples of the method, apparatus, and non-transitory computer-readable medium described herein may further include processes, features, means, or instructions for identifying data traffic load in at least one communication medium associated with transmission of the synchronization beacon to the station. Some examples of the method, apparatus, and non-transitory computer-readable medium described herein may further include processes, features, means, or instructions for adapting the transmission timing of the synchronization beacon based at least in part on the identified data traffic load in the at least one communication medium.

Some examples of the method, apparatus, and non-transitory computer-readable medium described herein may further include processes, features, means, or instructions for determining whether the at least one communication medium may be overloaded based at least in part on the identified data traffic. Some examples of the method, apparatus, and non-transitory computer-readable medium described herein may further include processes, features, means, or instructions for suspending transmission of the synchronization beacon associated with the lower-power radio based at least in part on the at least one communication medium being overloaded. Some examples of the method, apparatus, and non-transitory computer-readable medium described herein may further include processes, features, means, or instructions for transmitting an operating mode indicator to the station based at least in part on the suspending, wherein the operating mode indicator comprises instructions for the station to monitor transmission of a wakeup message from the access point in an action frame or a HE control field of a data frame, or both.

Some examples of the method, apparatus, and non-transitory computer-readable medium described herein may further include processes, features, means, or instructions for identifying a configuration of listen slots associated with the station, wherein the configuration of the listen slots comprises a duration of each listen slot. Some examples of the method, apparatus, and non-transitory computer-readable medium described herein may further include processes, features, means, or instructions for adapting the transmission timing of the synchronization beacon based at least in part on the configuration of the listen slots.

Some examples of the method, apparatus, and non-transitory computer-readable medium described herein may further include processes, features, means, or instructions for identifying a retransmission rate associated with transmission of a wakeup signal to the station, wherein the retransmission rate may be based at least in part on an absence of receiving a polling, or an acknowledgment (ACK) message, or both, from the station. Some examples of the method, apparatus, and non-transitory computer-readable medium described herein may further include processes, features, means, or instructions for adapting the transmission timing of the synchronization beacon based at least in part on the retransmission rate. In some examples of the method, apparatus, and non-transitory computer-readable medium described herein, the wakeup radio comprises a low-power radio.

A method of for wireless communications is described. The method may include identifying an operating condition of the station, transmitting a metric for a wakeup radio operation to an access point, wherein the operating condition of the station is based at least in part on the metric for the wakeup radio operation, and operating the primary radio or the wakeup radio, or both, based at least in part on the operating condition and the wakeup radio operation metric.

An apparatus for wireless communications is described. The apparatus may include means for identifying an operating condition of the station, means for transmitting a metric for a wakeup radio operation to an access point, wherein the operating condition of the station is based at least in part on the metric for the wakeup radio operation, and means for operating the primary radio or the wakeup radio, or both, based at least in part on the operating condition and the wakeup radio operation metric.

Another apparatus for wireless communications is described. The apparatus may include a processor, memory in electronic communication with the processor, and instructions stored in the memory. The instructions may be operable to cause the processor to identify an operating condition of the station, transmit a metric for a wakeup radio operation to an access point, wherein the operating condition of the station is based at least in part on the metric for the wakeup radio operation, and operate the primary radio or the wakeup radio, or both, based at least in part on the operating condition and the wakeup radio operation metric.

A non-transitory computer readable medium for wireless communications is described. The non-transitory computer-readable medium may include instructions operable to cause a processor to identify an operating condition of the station, transmit a metric for a wakeup radio operation to an access point, wherein the operating condition of the station is based at least in part on the metric for the wakeup radio operation, and operate the primary radio or the wakeup radio, or both, based at least in part on the operating condition and the wakeup radio operation metric.

Some examples of the method, apparatus, and non-transitory computer-readable medium described herein may further include processes, features, means, or instructions for transmitting the metric in an action frame or a HE control field of a data frame, or both, from the station to the access point. Some examples of the method, apparatus, and non-transitory computer-readable medium described herein may further include processes, features, means, or instructions for transmitting a power status or battery life indicator from the station to the access point.

Some examples of the method, apparatus, and non-transitory computer-readable medium described herein may further include processes, features, means, or instructions for transmitting an indication of a power mode or a charging mode from the station to the access point, wherein the primary radio or the wakeup radio, or both, may be operated based at least in part on the power mode. Some examples of the method, apparatus, and non-transitory computer-readable medium described herein may further include processes, features, means, or instructions for transmitting class information of the station to the access point, wherein the class information comprises at least clock drift information associated with the station.

Some examples of the method, apparatus, and non-transitory computer-readable medium described herein may further include processes, features, means, or instructions for transmitting an indication of a synchronization mode from the station to the access point, wherein the primary radio or the wakeup radio, or both, may be operated based at least in part on the indication of the synchronization mode or a preferred method of synchronization. In some examples of the method, apparatus, and non-transitory computer-readable medium described herein, the wakeup radio comprises a low-power radio.

DETAILED DESCRIPTION

Figure 1:
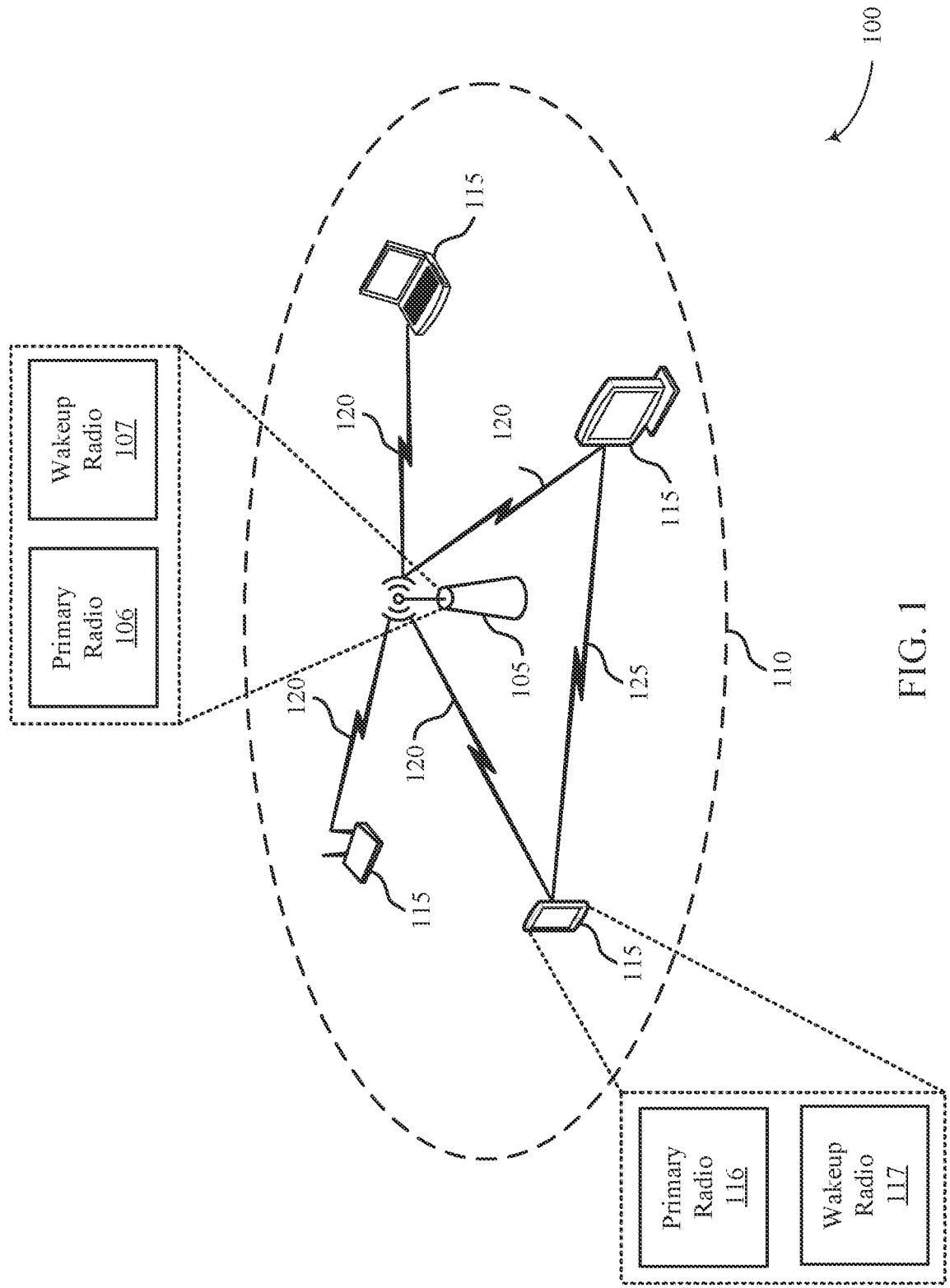
FIG. 1 illustrates an example of a system for wireless communications that supports adaptive transmissions of wakeup radio synchronization beacons in accordance with aspects of the present disclosure.

An access point (AP) may adapt a synchronization beacon transmission timing based on an operating condition of one or more stations (STAs) in a wireless local area network (WLAN). This may allow use of a transmission medium that accounts for changes in operation or capabilities of STAs in the system, including whether and how a STA may be operating a low-power radio or wakeup radio (wireless local area network). This may allow for improved efficiency in transmission medium use as compared with prior solutions that do not employ synchronization beacons or may not dynamically adapt transmission timing of such beacons.

By way of example, WLAN devices, such as Wi-Fi 802.11 devices, may be equipped with a low-power wakeup radio (WUR) to improve power efficiency and latency for communication in the WLAN. Similarly, APs in the WLAN may be equipped with their own low-power WUR, in addition to a main or primary radio. An AP may have pending downlink (DL) data for one or more STAs. The one or more STAs may be in an idle mode (e.g., low power mode), in which the STA receives signals using the low-power WUR. Prior to transmitting the pending DL data to the one or more STAs, the AP first signals to the STA to "wake up," which may include activating or powering up aspects of radio frequency (RF) chain.

In some systems that attempt to provide power efficiency and latency to WLAN devices, an AP periodically transmits synchronization beacons on its low-power WUR to one or more STAs in the WLAN. The one or more STAs receive the synchronization beacon on each of the STAs' respective WURs during a designated time period (i.e., listening slot). The transmission of the synchronization beacons by the AP may allow for the one or more STAs to maintain synchronization with the AP. The one or more STAs may maintain synchronization with the AP based on a time synchronization function (TSF) carried in the synchronization beacon. For example, synchronization between an AP and a STA may include the STA correcting its own clock timing using the TSF received in the synchronization beacon. As a result, a clock drift between the STA and the AP may be mitigated.

The AP, in addition to transmitting the synchronization beacon, may also transmit a wakeup signal via its low-power WUR at each STA's listening slot when data for the STA is available. In other words, the wakeup signal may instruct each of the STAs to "turn on" or activate a main or primary radio to receive the pending DL data. An AP, in some examples, may have pending DL data for a STA. In some cases, the STA may be in an idle mode (e.g., a low power mode), in which the STA receives signals using the WUR. For example, in the idle mode a STA may switch OFF its main radio and turn ON its WUR. The AP may signal to the STA to "wake up" before transmitting the pending DL data, for example, by transmitting a wakeup signal to the STA's WUR. In some examples, an AP may periodically transmit a synchronization beacon on its WUR to the STA. The STA may receive the synchronization beacon via its WUR during a listening slot of the STA. In some cases, the STA may be aware of a transmission timing associated with a time at which the AP may be to transmit a synchronization beacon.

Transmission of the synchronization beacon by the AP may have a long duration due to a low data rate. As a result, transmitting the synchronization beacon may reduce availability of the communication medium in the WLAN. In other words, there exists opportunity for increasing availability of the communication medium in the WLAN by improving techniques for transmitting synchronization beacons to STAs. According to the present disclosure, an AP in communication with a STA may improve the availability of the communication medium. For instance, an AP may refrain from transmitting a synchronization beacon to a STA based on an operating condition of the STA. Additionally, or alternatively, the AP may adapt a transmission frequency of the synchronization beacon to increase availability of a communication medium in the WLAN based one or more factors, which is discussed in more detail below.

Aspects of the disclosure are initially described in the context of a wireless communications system. Exemplary wireless devices (e.g., STAs and APs), systems, and process flows for adaptive transmissions of WUR synchronization beacons are then described. Aspects of the disclosure are further illustrated by and described with reference to apparatus diagrams, system diagrams, and flowcharts that relate to adaptive transmissions of wakeup radio synchronization beacons.

FIG. 1 illustrates an example of a system 100 for wireless communications that supports adaptive transmissions of wakeup radio synchronization beacons in accordance with aspects of the present disclosure. The system 100 for wireless communications may be a WLAN (also known as a Wi-Fi network) configured in accordance with various aspects of the present disclosure. The system 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc.

STAs 115 may be equipped with a low-power WUR to improve power efficiency and latency for communication in the WLAN. Similarly, APs 105 in the WLAN may be equipped with their own low-power WUR. AP 105 may have pending DL data for one or more STAs 115. In some cases, at least one of the STAs 115 may be in a low-power mode (e.g., where a main radio of the STA 115 is switched OFF), in which the STA 115 receives signals using the low-power WUR. Prior to the AP 105 transmitting the pending DL data to the STA 115, the AP 105 may signal the STA 115 to switch its main radio ON. Transmission of the synchronization beacon however, in some cases, may have an extensive duration in which it occupies a communication medium (of system 100), due to a low data rate. As a result, transmission of the synchronization beacon may reduce availability of the communication medium in the WLAN. In some cases, to improve the availability of the communication medium, AP 105 may skip transmitting a synchronization beacon to a STA 115. Additionally, or alternatively, the AP 105 may adapt a transmission frequency of the synchronization beacon to increase availability of a communication medium in the WLAN (system 100).

An AP 105 may include a primary radio 106 and WUR 107 for communication with the one or more STAs 115 in system 100. The primary radio 106 may be used to transmit pending DL data to one or more STAs 115. The WUR 107 may be used to transmit one or more synchronization beacons to the one or more STAs 115. Similarly, STAs 115 may include a primary radio 116 and a WUR 117 for communication. The primary radio 116 may be used during active modes or for high-data throughput applications. In some examples, the primary radio 116 may be a Wi-Fi radio (e.g., it may be operable to support Wi-Fi communications) or a radio operable to support Bluetooth®. The WUR 117 may be used during low-power modes or for low-throughput applications. The primary radios (i.e., primary radio 106 or primary radio 116) and the low-power radios (i.e., WUR 107 or WUR 117) may be associated with different antennas or with the same antenna, and they may have different receive or transmit chains or share portions of a receive chain or a transmit chain.

In some examples, the WUR 107 or the WUR 117 may be configured to communicate using a narrowband frequency spectrum (e.g., to conserve battery). Alternatively, the primary radio 106 and the primary radio 116 may be configured to communicate (e.g., via communication link 120) using a wider portion of the frequency spectrum (e.g., in order to enable high data throughput). The narrowband frequency spectrum may be a subset of the wider portion of the frequency spectrum, include a portion of the wider portion of the frequency spectrum, or be distinct from the wider portion of the frequency spectrum.

The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of system 100. An extended network station (not shown) associated with the system 100 may be connected to a wired or wireless distribution system that may allow multiple APs 105 to be connected in an ESS.

Although not shown in FIG. 1, a STA 115 may be located in the intersection of more than coverage area 110 and may associate with more than one AP 105. A single AP 105 and an associated set of STAs 115 may be referred to as a BSS. An overlapping BSS (OBSS) may include more than one BSS that use some of the same resources. An ESS is a set of connected BSSs. A distribution system (not shown) may be used to connect APs 105 in an ESS.

In some cases, the coverage area 110 of an AP 105 may be divided into sectors (also not shown). The system 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless communication links 120 may include Wi-Fi Direct connections, Wi-Fi Tunneled Direct Link Setup (TDLS) links, and other group connections. STAs 115 and APs 105 may communicate according to the WLAN radio and baseband protocol for physical and medium access control (MAC) layers from Institute of Electrical and Electronics Engineers 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of a request-to-send (RTS) packet transmitted by a sending STA 115 (or AP 105) and a clear-to-send (CTS) packet transmitted by the receiving STA 115 (or AP 105). This may alert other devices within range of the sender and receiver not to transmit for the duration of the primary transmission. Thus, RTS/CTS may help mitigate a hidden node problem.

STAs 115 may communicate (e.g., via communication link 120) according to the radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100. Devices in system 100 may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands.

The STAs 115 may be designed to allow a user to transmit and receive data to and from various networks and entities (e.g., another STA 115). The primary radio 116 may be configured to provide a relatively high throughput of data to meet the general expectations of a user of the STA 115. In some cases, high data-throughput primary radio 116 may be associated with more power than other types of radios (e.g., a WUR 117 or other low-power radios). In some examples, a STA 115 may have a limited amount of battery power.

In some cases, a wireless device (e.g., a STA 115) may operate in a low-power mode (e.g., to conserve a limited amount of battery power) by powering down or off all or portions of a primary radio 116. The wireless device may also reduce the frequency of certain operations, including network communications, memory accesses or updates, or other background processes. During operation in a low-power mode, the wireless device may operate a WUR 117 (e.g., to listen for wakeup signals) which may originate from another STA 115 or an AP 105. The WUR 117 may be activated periodically or always powered on, and may be a separate radio from the primary radio 116, or share components of the primary radio 116 that operate in a low-power state. In some cases, the wakeup transmission may indicate whether communications are waiting to be transmitted to the STA 115 (e.g., from an AP 105).

In some cases, an AP 105 may use transmissions intended for one or more WURs 117 to wakeup multiple STAs 115 (e.g., IoT devices) associated with the AP 105 for transmission of pending DL from the AP 105 to STAs 115. An AP 105 may wakeup multiple STAs 115 by transmitting synchronization beacons to STAs 115. Transmission of the synchronization beacons, however, in some cases, may have an extensive duration in which it occupies a communication medium (of system 100), due to a low data rate. As a result, transmission of the synchronization beacon reduces availability of the communication medium in the WLAN. In some cases, to improve the availability of the communication medium, AP 105 may skip transmitting a synchronization beacon to a STA 115. Alternatively, the AP 105 may adapt a transmission frequency of the synchronization beacon to increase availability of a communication medium in the WLAN (system 100).

Figure 2:
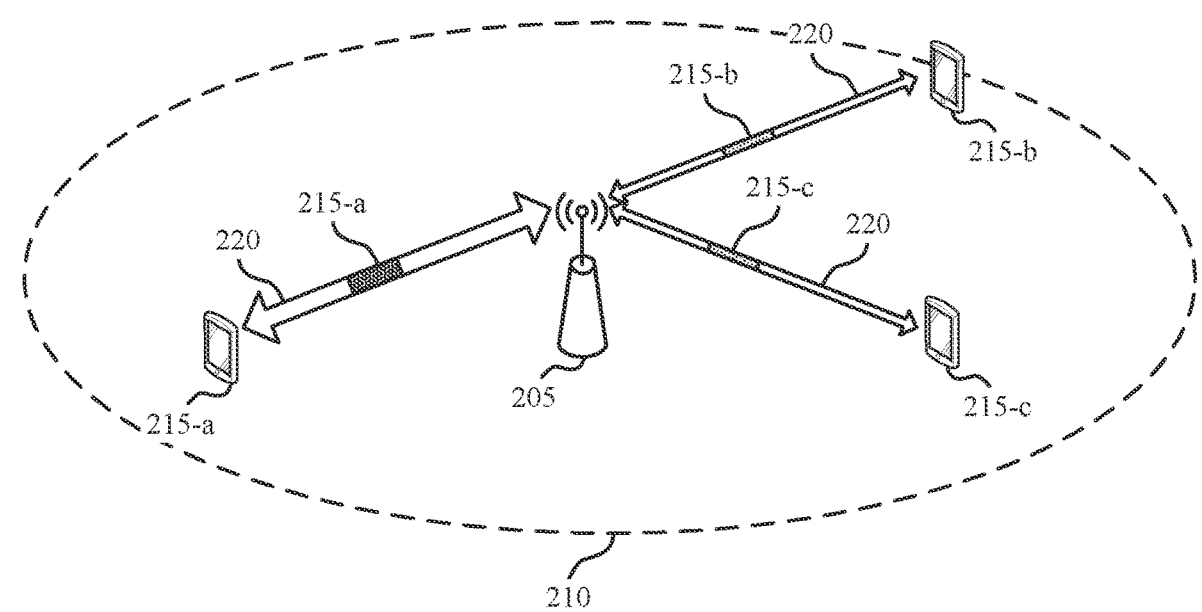
FIG. 2 illustrates an example of a system that supports adaptive transmissions of wakeup radio synchronization beacons in accordance with aspects of the present disclosure.

FIG. 2 illustrates an example of a system 200 that supports adaptive transmissions of wakeup radio synchronization beacons in accordance with aspects of the present disclosure. System 200 may be an example of system 100 as described with reference to FIG. 1, and may be a WLAN. System 200 may include STA 215-a, STA 215-b, and STA 215-c, and an AP 205, each of which may be examples of the corresponding devices described with reference to FIG. 1. That is, in some cases one or more of the STAs 115 may include a primary radio and a WUR. Aspects of the following communication examples are described as occurring between AP 205 and STA 215-a, STA 215-b, and STA 215-c. However, it is to be understood that the described techniques are also applicable to communication between more than the three STAs (STA 215-a, STA 215-b, and STA 215-c).

STA 215-a, STA 215-b, and STA 215-c may be located within coverage area 210. Each of STA 215-a, STA 215-b, and STA 215-c may communicate (i.e., receive DL data and transmit UL data) with each other and with AP 205 using a primary radio (e.g., via a communication link 220) or WUR. These communications may rely on the use of collision avoidance procedures (e.g., clear channel assessment (CCA), listen-before-talk (LBT), RTS/CTS, or any other applicable technique). Such procedures may reduce the frequency of collisions of data packets in system 200.

AP 205 may include a primary radio and WUR for communication with the one or more STAs 215, as described with reference to FIG. 1. The primary radio may be used to transmit pending DL data to one or more STAs 215. The WUR may also be used to transmit one or more synchronization beacons to the one or more STAs 215. Similarly, STAs 215 may include a primary radio and a WUR for communication, as described with reference to FIG. 1. The primary radio may be used during active modes or for high-data throughput applications. Additionally, or alternatively, the primary radio may be a Wi-Fi radio (e.g., it may be operable to support Wi-Fi communications). The WUR may be used during low-power modes or for low-throughput applications. The primary radios may be associated with different antennas or with the same antenna, and they may have different receive or transmit chains or share portions of a receive chain or a transmit chain.

AP 205 may periodically transmit synchronization beacons on its WUR to one or more STAs 215. Each of the one or more STAs 215 may receive the synchronization beacon on the STA's 215 WUR, during one or more time slots. The transmission of the synchronization beacons by the AP 205 may be for the one or more STAs 215 to maintain synchronization with the AP 205. The one or more STAs 215 may maintain synchronization with the AP 205 based on a TSF carried in the synchronization beacon. For example, synchronization between an AP 205 and a STA 215 may include the STA 215 correcting its own clock timing using the TSF received in the synchronization beacon. As a result, a clock drift between the STA 215 and the AP 205 may be mitigated.

In some cases, the TSF may be defined according to a beacon period function (e.g., a beacon period defined by a dot11WBeaconPeriod function). The beacon period function may define a series of transmission times at which the synchronization beacons are to be transmitted, each of the synchronization beacons separated by a defined beacon period. Accordingly, at each defined transmission time after each beacon period, the AP 205 may schedule a beacon frame as the next frame. The AP 205 may signal the beacon period to one or more STAs 215 in a beacon period indicator (e.g., a WUR mode element). A STA 215 may receive the beacon period indicator, and accordingly adopt that the beacon period function indicated by the beacon period indicator when joining the BSS. For example, AP 205 may signal a dot11WBeaconPeriod function via the beacon period indicator, and the receiving STA 215 may then set its beacon period function to the indicated dot11WBeaconPeriod function. In some cases, however, the AP 205 refrain from scheduling a beacon frame as the next frame, for example, when there are no WUR-capable STAs 215 associated with the AP 205, when the AP 205 does not provide WUR service to the corresponding STAs 215, or when all of the primary radios of the corresponding STAs 215 are already in an awake state. In some cases, the AP 205 may suspend other pending transmissions during the beacon frame.

In some cases, AP 205 may have intended data (e.g., pending DL data) for one or more primary radios of STAs 215 (i.e., STA 215-a, STA 215-b, and STA 215-c). AP 205 may transmit synchronization beacons to WURs of corresponding STAs to wakeup multiple STAs for transmitting the intended data from the AP 205 to STAs 215 (i.e., STA 215-a, STA 215-b, and STA 215-c). The AP 205, in addition to transmitting the synchronization beacon, may also transmit a wakeup signal via its WUR to each STA's 215 time slot (i.e., listening slot). In other words, the wakeup signals may instruct each of the STAs 215 to turn ON a primary radio to receive the pending DL data from AP 205.

Transmission of the synchronization beacons, in some cases, may have an extensive duration in which it occupies a communication medium of system 200. As such, transmission of the synchronization beacon may reduce availability of the communication medium in system 200. In some cases, to improve the availability of the communication medium, AP 205 may refrain transmitting a synchronization beacon to STAs 215. For example, AP 205 may refrain from transmitting the synchronization beacon to one or more of the STAs 215 when AP 205 determines that some or all of the STAs 215 do not have any WUR capability. In some cases, AP 205 may refrain from transmitting the synchronization beacon to one or more of the STAs 215 when AP 205 determines that none of the STAs 215 is in a WUR mode. Additionally, or alternatively, AP 205 may refrain from transmitting the synchronization beacon to one or more of the STAs 215 when AP 205 determines none of the STAs 215 are configured to receive the synchronization beacon via the WUR of the STAs 215. In some cases, AP 205 may refrain from transmitting the synchronization beacon to one or more of the STAs 215 irrespective of whether the STAs 215 are in a WUR mode.

In some examples, each of the STAs 215 may identify an operating condition. The operating condition of the STA may be associated with the primary radio or the WUR of each of the STAs 215. After identifying the operating condition, each of the STAs 215 may transmit a metric for a WUR operation to AP 205 via communication links 220. In some cases, STAs 215 may operate the primary radio or the WUR based on the operating condition and the WUR operation metric. AP 205 may identify the operating condition of each of the STAs 215 based on the received operating condition.

In some cases, to improve the availability of the communication medium, AP 205 may adapt a transmission timing of a synchronization beacon associated with the WUR of each of the STAs 215. The transmission timing of the synchronization beacon may be associated with the frequency of transmission of the synchronization beacon by the AP 205, as described with reference to FIG. 3. The adaptation of the transmission timing may also be based on the operating condition associated with each of the STAs 215. In some cases, AP 205 may refrain from transmitting one or more instance of the synchronization beacon to STAs 215 based on the operating condition associated with each of the STAs 215 (STA 215-a, STA 215-b, and STA 215-c).

AP 205 may, in some examples, receive a WUR capability indication from one or more of STAs 215. The WUR capability indication may be received in part with the operating condition from the one or more STAs 215. Additionally, or alternatively, AP 205 may receive the WUR capability indication in an association request message from the one or more STAs 215. AP 205 may adapt the transmission timing of one or more synchronization beacons based on the WUR capability indication associated with the one or more STAs 215. Alternatively, AP 205 may refrain from transmitting the one or more synchronization beacons to STAs 215 based on the WUR capability indication or the adapted transmission timing.

AP 205 may in some cases receive a WUR mode indication from one or more of STAs 215. The AP 205 may receive the WUR mode indication in an action frame or a high efficiency (HE) control field of a data frame, or both, from one or more of STAs 215. The WUR mode indication may identify whether a corresponding STA's 215 WUR may be switched ON or OFF (i.e., activated or deactivated), that is whether the corresponding STA 215 is communicating via a primary radio or a WUR. For example, AP 205 may determine that STA 215-*a* is in a WUR mode (i.e., WUR of STA 215-*a* is ON) based on the received WUR mode indication. AP 205 may then adapt the transmission timing of the synchronization beacon to STA 215-*a*, accordingly. Alternatively, AP 205 may determine that STA 215-*b* is not in a WUR mode (i.e., WUR of STA 215-*b* is OFF). In other words, STA 215-*b* may be communicating via a primary radio. AP 205 may continue to transmit synchronization beacons to STA 215-*b* at a preconfigured transmission timing (e.g., at a default transmission rate (every 4 listening slots of STA 215-*b*)) or refrain from transmitting the synchronization beacon based on the received WUR mode indication from STA 215-*b*.

In some cases, the WUR mode indication transmitted by STAs 215 (i.e., STA 215-*a*, STA 215-*b*, and STA 215-*c*) may indicate to AP 205 when each of the STAs 215 may enter a WUR mode or withdraw from the WUR mode—i.e., an indication of whether a STA 215 may monitor for a WUR wakeup signal(s) from AP 205. In some cases, one or more of STAs 215 may withdraw from the WUR mode based on a trigger. A trigger may include, but is not limited to, STAs 215 withdrawing from a BSS associated with AP 205, STAs 215 having sensitive data traffic, or STAs 215 having sufficient battery life or charge to communicate via a primary radio, or any combination thereof.

AP 205 may identify an operating condition of STAs 215 based on data traffic associated with each of the STAs 215. For instance, AP 205 may determine that data traffic of one or more of STAs 215 includes delay sensitive data traffic. Determining that one or more of the STAs 215 have delay sensitive data traffic may indicate to AP 205 that the corresponding STAs 215 may maintain communication via a corresponding primary radio. In other words, AP 205 may determine the one or more of STAs 215 withdrew from a WUR mode based on determining that the data traffic of one or more of STAs 215 includes delay sensitive data traffic.

AP 205 may, additionally, or alternatively, identify an operating condition of STAs 215 based on a power status associated with each of the STAs 215. AP 205 may receive a power status indicator from one or more of STAs 215. For example, STA 215-*a* may transmit a power status indicator identifying a battery life of STA 215-*a* to AP 205. AP 205 may determine that STA 215-*a* is in a WUR mode based on the battery life identified in the power status indicator. Alternatively, STA 215-*c* may transmit a power status indicator identifying a charging status to AP 205. The charging status may indicate a charging mode of STA 215-*c*, e.g., identifying that STA 215-*c* is being charged by an external source (e.g., 120 VAC). As a result, AP 205 may determine that STA 215-*c* withdrew from a WUR mode based on the identified charging status. As a result, AP 205 may refrain from transmitting one or more synchronization beacons to STA 215-*c*.

In some examples, AP 205 may determine to refrain from transmitting one or more synchronization beacons to one or more of the STAs 215 irrespective of whether the STAs 215 are in WUR mode. AP 205 may identify a periodic data traffic pattern associated with STAs 215. Subsequent to identifying the periodic data traffic pattern, AP 205 may compare the periodic data traffic pattern to a synchronization beacon transmission interval. In some cases, the synchronization beacon transmission interval may be different or the same for each of STAs 215. AP 205 may determine that the periodic data traffic pattern for one or more of STAs 215 satisfies a threshold value associated with a WUR mode. For example, a threshold value may include at least one data traffic frame per a synchronization beacon interval (e.g., 10 seconds). The data traffic may be associated with voice, video chat, and messenger applications that broadcast periodic keep alive signals. In some examples, satisfaction of the threshold value by one or more STAs 215 may indicate that the corresponding WUR for the one or more STAs 215 is in an active status (e.g., continuously ON). As a result, AP 205 may refrain from transmitting one or more instances of the synchronization beacon to one or more of STAs 215 using the WUR.

STAs 215 may use other techniques to synchronize with AP 205. In some cases, when AP 205 transmits a wakeup signal to one or more STAs 215, STAs 215 may determine whether the wakeup signal includes TSF. If the wakeup signal includes TSF, STAs 215 may synchronize with AP 205 using the wakeup signal. The TSF may be part of a HE control field of a data frame in the wakeup signal. Alternatively, STAs 215 may use a data traffic frame on the corresponding primary radio of STAs 215 to synchronize with AP 205. STAs 215 may alternatively use synchronization beacons received on their corresponding primary radios for synchronization with AP 205, after verifying that the received beacons are successive to received wakeup signal(s). For example, STAs 215 may identify a synchronization beacon based on a delivery traffic indication message (DTIM) and hence multicast traffic frame.

In some examples, STAs 215 may indicate to AP 205 a request for AP 205 to transmit synchronization beacons to the WUR of the corresponding STAs 215. For example, one or more of STAs 215 may transmit an indication of a synchronization mode to AP 205, where the primary radio or the WUR of the corresponding STAs 215, or both, are operated based on the synchronization mode. The synchronization mode may include whether a STA is configured to receive or would benefit from receiving synchronization or a preferred method of synchronization. STAs 215 may transmit the indication in a HE control field of a data frame, or both.

Additionally, or alternatively, the AP 205 may adapt a transmission frequency of the synchronization beacon to increase availability of a communication medium in system 200. In some cases, AP 205 may adapt the transmission frequency of the synchronization beacon based on one or more factors associated with STAs 215. The one or more factors may include a STA's clock drift, a total medium occupancy, a configuration of listen slots, a WUR wakeup failure rate, or any combination thereof.

One or more STAs 215 may transmit class information associated with each of the STAs 215 to AP 205. The class information may include at least clock drift information associated with each of the STAs 215. AP 205 may identify a clock drift of each of the STAs 215, and adapt a transmission timing of one or more synchronization beacons based on the clock drift. In some cases, for example to meet a maximum time shift error requirement (e.g., 2 ms), a transmission timing interval of the synchronization beacons may be a predetermined length (e.g., 10 s or 20 s)—i.e., if a STA's 215 clock drift is between 100 and 200 ppm.

AP 205 may, additionally, or alternatively, identify a data traffic load in at least one communication medium associated with transmission of one or more synchronization beacons to STAs 215. The at least one communication medium may be associated with communication links 220. AP 205 may determine whether the at least one communication medium is overloaded based on the identified data traffic. AP 205 may reduce a transmission frequency of one or more synchronization beacons when the data traffic load of the communication medium satisfies a threshold value. In other words, instead of transmitting every N+1 listening slots, AP 205 may be transmitting synchronization beacons every N+2 listening slots to STAs 215.

AP 205 may suspend transmission of the synchronization beacon associated with the WUR based on the at least one communication medium being overloaded. For instance, when AP 205 determines that the data traffic load of the communication medium satisfies a threshold value, AP 205 may transmit a request to STAs 215 to turn OFF their WUR and synchronize with the AP 205 using wakeup signals transmitted on a primary radio. AP 205 may transmit the request as an operating mode indicator to STAs 215. The operating mode indicator may include instructions for one or more of the STAs 215 to monitor transmission of a wakeup message from the AP 205 in an action frame or a HE control field of a data frame, or both.

AP 205 may alternatively adapt a transmission frequency of the synchronization beacon to increase availability of a communication medium in system 200 based on a configuration of listening slots associated with STAs 215. AP 205 may identify a configuration of listen slots associated with each of the STAs 215. The configuration of the listen slots may include a duration of each listen slot. AP 205 may adapt the transmission timing of one or more synchronization beacons based on the configuration of the listen slots. In some cases, if the listen slot of a STA, e.g., STA 215-*a* is short, the transmission interval of the AP 205 to transmit one or more synchronization beacons may be adjusted to adapt to the listen slot of STA 215-*a*.

Additionally, or alternatively, AP 205 may adapt a transmission frequency of the synchronization beacon to increase availability of a communication medium in system 200 based on a retransmission rate associated with STAs 215. AP 205 may identify a retransmission rate associated with transmission of a wakeup signal to one or more of STAs 215. The retransmission rate may be based on an absence of receiving a polling, or an acknowledgment (ACK) message, or both, from one or more of STAs 215. As a result, AP 205 may adapt a transmission timing of one or more synchronization beacons based on the retransmission rate.

Figure 3:
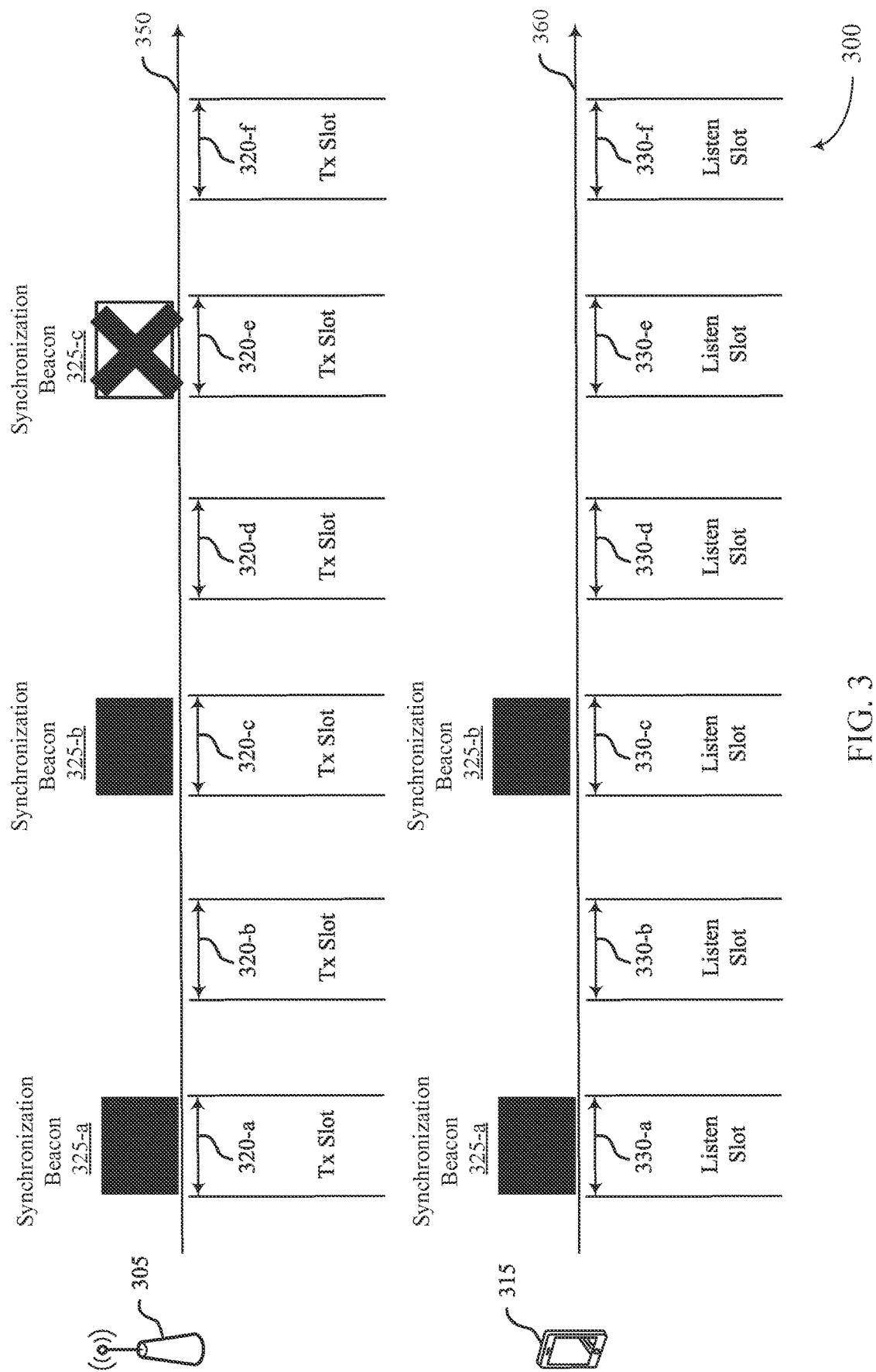
FIG. 3 illustrates an example of a system that supports adaptive transmissions of wakeup radio synchronization beacons in accordance with aspects of the present disclosure.

FIG. 3 illustrates an example of a system 300 that supports adaptive transmissions of wakeup radio synchronization beacons in accordance with aspects of the present disclosure. System 300 may be an example of system 100 and 200 as described with reference to FIGS. 1 and 2, and may be a WLAN. System 300 may include STA 315 and AP 305, each of which may be examples of the corresponding devices described with reference to FIGS. 1 and 2. That is, in some cases STA 315 may include a primary radio and a WUR. Aspects of the following communication examples are described as occurring between AP 305 and STA 315. However, it is to be understood that the described techniques are also applicable to communication between more than STA 315 and AP 305.

AP 305 may include a primary radio and WUR for communication with STA 315, as described with reference to FIGS. 1 and 2. The primary radio may be used to transmit pending DL data to STA 315. The WUR may also be used to transmit one or more synchronization beacons to STA 315. AP 305 may be associated with a transmission interval 350. Transmission interval 350 may include a plurality of transmission slots 320 (e.g., transmission slot 320-*a*, transmission slot 320-*b*, transmission slot 320-*c*, transmission slot 320-*d*, transmission slot 320-*e*, and transmission slot 320-*f*). AP 305 may transmit one or more synchronization beacons (e.g., synchronization beacon 325-*a*, synchronization beacon 325-*b*, or synchronization beacon 325-*c*) to STA 315 in one or more of the transmission slots 320 of transmission interval 350. As described with reference to FIG. 2, transmission interval 350 may be adjusted based on an operating condition of STA 315. Additionally, or alternatively, one or more of the transmission slots 320 for transmitting synchronization beacons may be adjusted based on the operating condition of STA 315.

Similarly, STA 315 may include a primary radio and a WUR for communication, as described with reference to FIGS. 1 and 2. The primary radio may be used during active modes or for high-data throughput applications. Additionally, or alternatively, the primary radio may be a Wi-Fi radio (e.g., it may be operable to support Wi-Fi communications). The WUR may be used during low-power modes or for low-throughput applications. The primary radios may be associated with different antennas or with the same antenna, and they may have different receive or transmit RF chains or share portions of a receive RF chain or transmit RF chain.

STA 315 may be associated with a listening interval 360. Listening interval 360 may include a plurality of listening slots 330 (e.g., listening slot 330-*a*, listening slot 330-*b*, listening slot 330-*c*, listening slot 330-*d*, listening slot 330-*e*, and listening slot 330-*f*). STA 315 may receive one or more synchronization beacons (e.g., synchronization beacon 325-*a*, synchronization beacon 325-*b*, or synchronization beacon 325-*c*) from AP 305 during one or more of the listening slots 330 of listening interval 360. As described with reference to FIG. 2, the listening interval 360 may be modified based on an operating condition of STA 315. Additionally, or alternatively, one or more of the listening slots 330 for receiving synchronization beacons may be modified based on the operating condition of STA 315.

As described with reference to FIG. 2, AP 305 may refrain transmitting a synchronization beacon to STA 315. For example, AP 305 may refrain from transmitting one or more of synchronization beacons 325 to STA 315, when AP 305 determines that STA 315 do not have any WUR capability. In some cases, AP 305 may refrain from transmitting one or more of synchronization beacons 325 to STA 315, when AP 305 determines that STA 315 is not in a WUR mode (i.e., WUR of STA 315 is OFF). Additionally, or alternatively, AP 305 may refrain from transmitting one or more of synchronization beacons 325 to STA 315, when AP 305 determines that STA 315 would not benefit to receive or is not configured to receive the synchronization beacon via the WUR of the STA 315. In some cases, AP 305 may refrain from transmitting one or more of synchronization beacons 325 to STA 315 irrespective of whether STA 315 is in a WUR mode.

AP 305 may identify a periodic data traffic pattern associated with STA 315. Subsequent to identifying the periodic data traffic pattern, AP 305 may compare the periodic data traffic pattern to a transmission interval 350 (e.g., synchronization beacon transmission interval). AP 305 may determine that the periodic data traffic pattern for STA 315 satisfies a threshold value associated with a WUR mode. For example, a threshold value may include at least one data traffic frame per a synchronization beacon interval (e.g., 10 seconds). The data traffic may be associated with voice, video chat, and messenger applications that broadcast periodic keep alive signals. In some examples, satisfaction of the threshold value by STA 315 may indicate that the corresponding WUR for the STA 315 is in an active status (e.g., continuously ON). As a result, AP 305 may refrain from transmitting one or more instances of the synchronization beacon 325 to STA 315 using the WUR. For example, AP 305 may refrain from transmitting synchronization beacon 325-c at instance (i.e., transmission slot 320-e) to STA 315.

Alternatively, AP 305 may identify an operating condition of STA 315 based on data traffic associated STA 315. For instance, AP 305 may determine that data traffic of STA 315 includes delay sensitive data traffic. Determining that STA 315 has delay sensitive data traffic may indicate to AP 305 that STA 315 may maintain communication via a corresponding primary radio. In other words, AP 305 may determine the STA 315 withdrew from a WUR mode based on determining that the data traffic STA 315 includes delay sensitive data traffic. Similarly, AP 305 may refrain from transmitting one or more instances of the synchronization beacon 325—AP 305 may refrain from transmitting synchronization beacon 325-c at instance (i.e., transmission slot 320-e) to STA 315.

Figure 4:
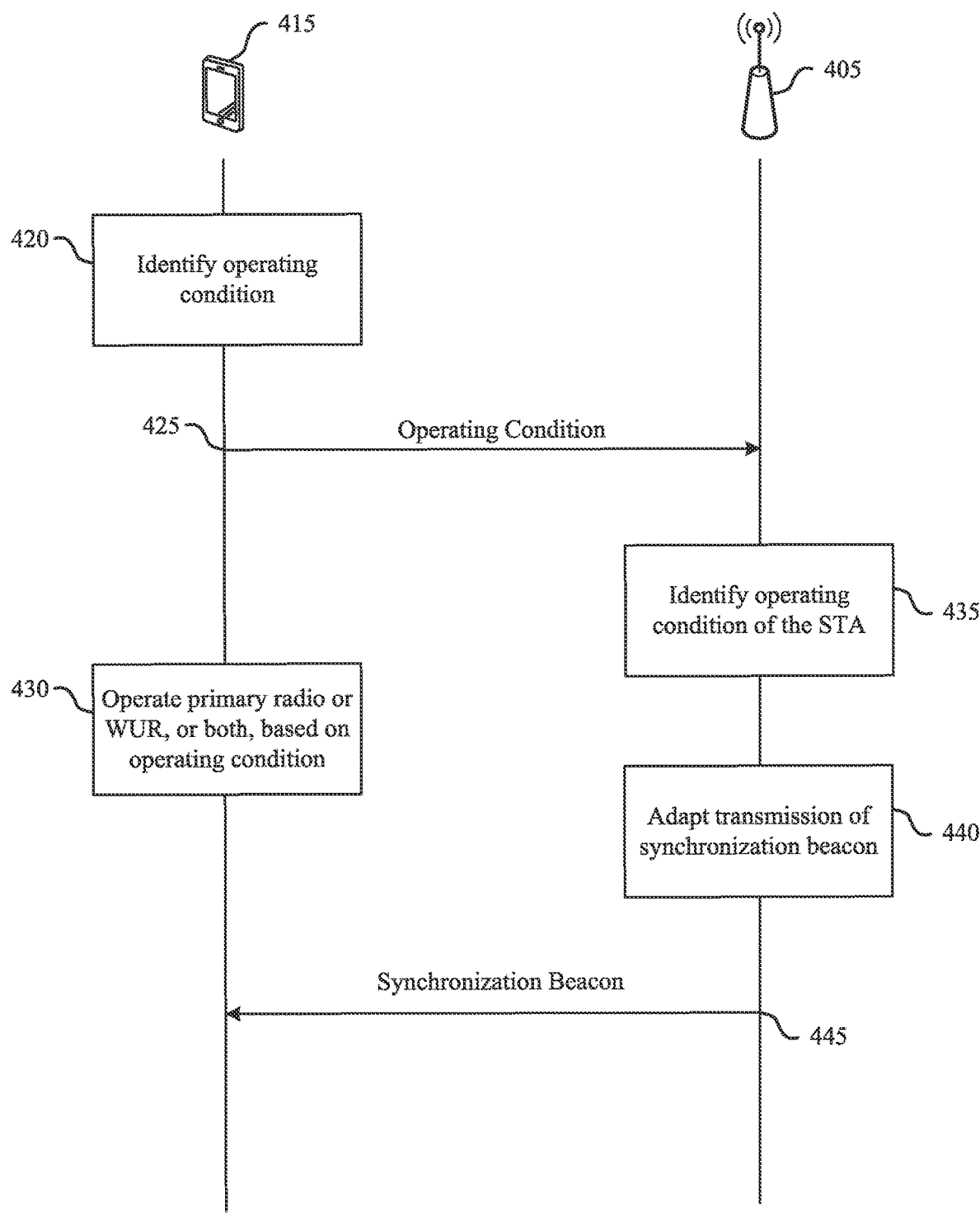
FIG. 4 illustrates an example of a process flow that supports adaptive transmissions of wakeup radio synchronization beacons in accordance with aspects of the present disclosure.

FIG. 4 illustrates an example of a process flow 400 that supports adaptive transmissions of wakeup radio synchronization beacons in accordance with aspects of the present disclosure. Process flow 400 may include AP 405 and STA 415, that may be examples of AP and STA as described with reference to FIGS. 1 through 3. AP 405 and STA 415 may include a primary radio and a WUR, as described with reference to FIGS. 1 through 3. Aspects of the following communication examples are described as occurring between AP 405 and STA 415.

At 420, STA 415 may identify an operating condition. An operating condition may include whether STA 415 is in a WUR mode, a clock drift associated with STA 415, a configuration of listening slots associated with STA 415, and a wakeup failure rate of STA 415, among others, or any combination thereof. At 425, STA 415 may transmit a metric for a WUR operation to AP 405. The operating condition of STA 415 may be based on the metric for the WUR operation.

At 435, AP 405 may identify an operating condition of STA 415. In some cases, identifying the operating condition of STA 415 may include determining that data traffic for the STA 415 includes delay sensitive data traffic, and determining that STA 415 withdrew from a wakeup radio mode based on determining that the data traffic for STA 415 includes delay sensitive data traffic. Alternatively, AP 405 may identify the operating condition of STA 415 based on receiving a power status indicator from STA 415, and determining that STA 415 withdrew from a WUR mode based on the power status indicator. In other examples, AP 405 may identify the operating condition of STA 415 based on determining that the WUR of STA 415 is in an active status (e.g., continuously ON).

At 440, AP 405 may adapt a transmission timing of a synchronization beacon associated with the WUR of STA 415 based on the identified operating condition. In some examples, AP 405 may adapt the transmission timing based on identifying a clock drift of STA 415, identifying data traffic load in at least one communication medium associated with transmission of the synchronization beacon to STA 415, identifying a configuration of listen slots associated with STA 415, or any combination thereof. At 445, AP 405 may transmit the synchronization beacon according to the adapted transmission timing. AP 405 or STA 415, or both, may employ additional techniques, including those as described with reference to FIGS. 13-17.

Figure 5:
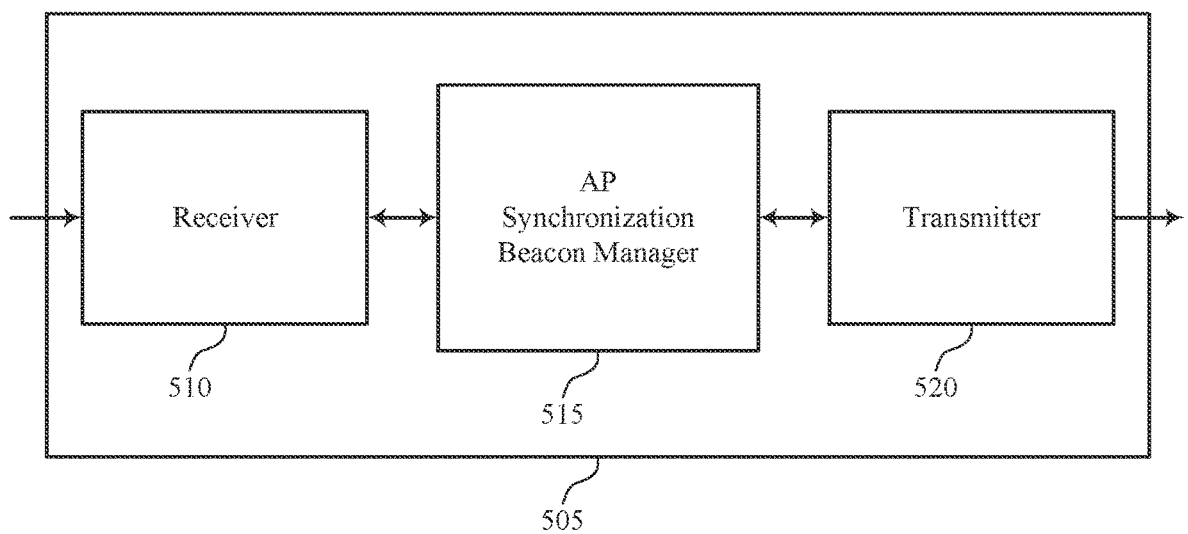
FIGS. 5 through 6 show block diagrams of a device or devices that support adaptive transmissions of wakeup radio synchronization beacons in accordance with aspects of the present disclosure.

FIG. 5 shows a block diagram 500 of a wireless device 505 that supports adaptive transmissions of wakeup radio synchronization beacons in accordance with aspects of the present disclosure. Wireless device 505 may be an example of aspects of an AP 105 as described with reference to FIG. 1. Wireless device 505 may include receiver 510, AP synchronization beacon manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to adaptive transmissions of wakeup radio synchronization beacons, etc.). Information may be passed on to other components of the device. The receiver 510 may be an example of aspects of the transceiver 835 described with reference to FIG. 8. The receiver 510 may utilize a single antenna or a set of antennas.

AP synchronization beacon manager 515 or at least some of its various sub-components may be implemented in hardware, software executed by a processor, firmware, or any combination thereof. If implemented in software executed by a processor, the functions of the AP synchronization beacon manager 515 or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The AP synchronization beacon manager 515 or at least some of its various sub-components may be physically located at various positions, including being distributed such that portions of functions are implemented at different physical locations by one or more physical devices. In some examples, AP synchronization beacon manager 515 or at least some of its various sub-components may be a separate and distinct component in accordance with various aspects of the present disclosure. In other examples, AP synchronization beacon manager 515 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

AP synchronization beacon manager 515 may identify an operating condition of a STA that includes a primary radio and a wakeup radio and adapt a transmission timing of a synchronization beacon associated with the wakeup radio of the STA based on the identified operating condition.

Transmitter 520 may transmit signals generated by other components of the device. Transmitter 520 may transmit a synchronization beacon according to the adapted transmission timing. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
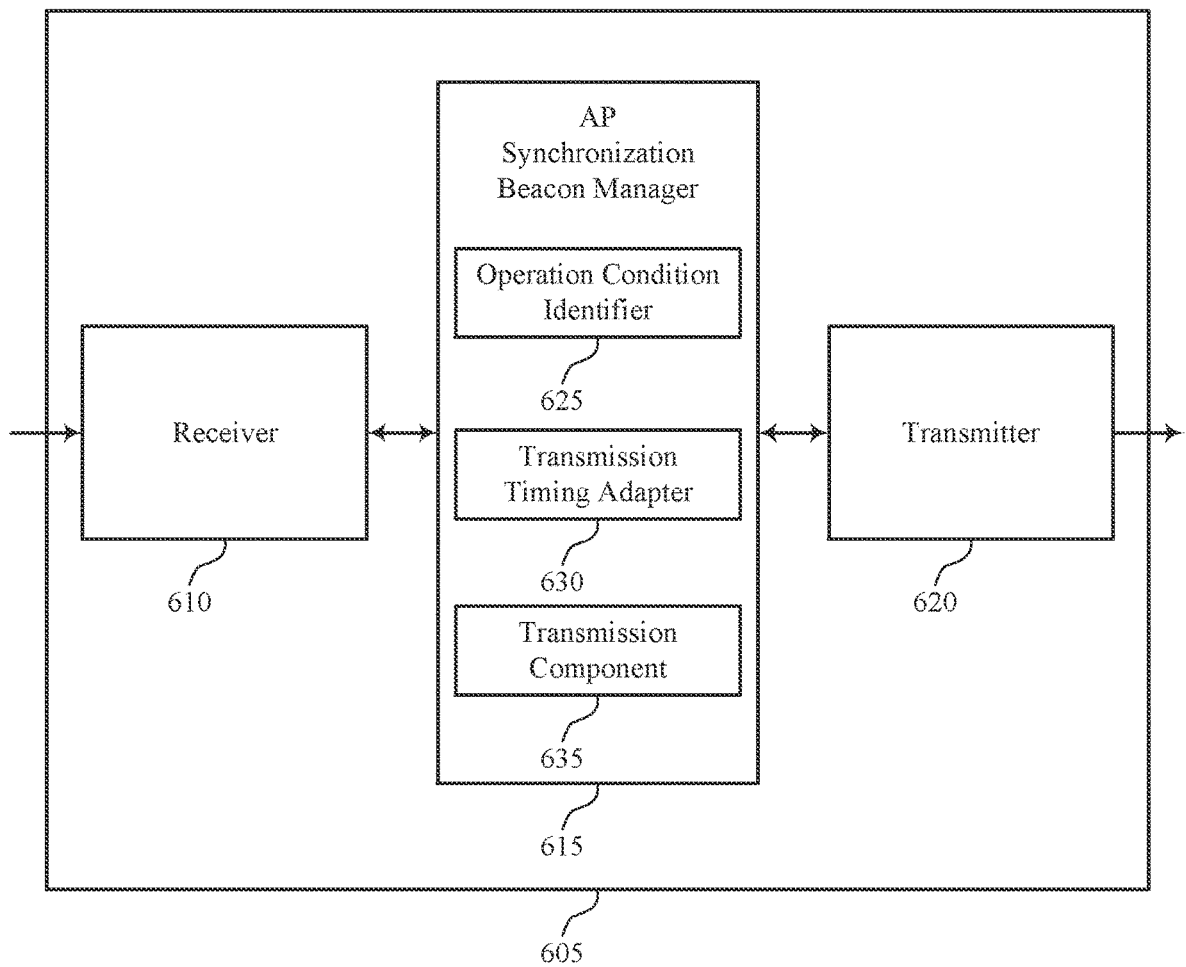

FIG. 6 shows a block diagram 600 of a wireless device 605 that supports adaptive transmissions of wakeup radio synchronization beacons in accordance with aspects of the present disclosure. Wireless device 605 may be an example of aspects of a wireless device 505 or an AP 105 as described with reference to FIGS. 1 and 5. Wireless device 605 may include receiver 610, AP synchronization beacon manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to adaptive transmissions of wakeup radio synchronization beacons, etc.). Information may be passed on to other components of the device. The receiver 610 may be an example of aspects of the transceiver 835 described with reference to FIG. 8. The receiver 610 may utilize a single antenna or a set of antennas.

AP synchronization beacon manager 615 may be an example of aspects of the AP synchronization beacon manager 515 described with reference to FIG. 5. AP synchronization beacon manager 615 may also include operation condition identifier 625, transmission timing adapter 630, and transmission component 635.

Operation condition identifier 625 may identify an operating condition of a STA that includes a primary radio and a wakeup radio. The operation condition identifier 625 may receive a wakeup radio capability indication from the STA, where the operation condition of the STA is identified based on receiving the wakeup radio capability. In some cases, the operation condition identifier 625 may receive, from the STA, an association request message including the wakeup radio capability indication.

Transmission timing adapter 630 may adapt a transmission timing of a synchronization beacon associated with the wakeup radio of the STA based on the identified operating condition. In some examples, transmission timing adapter 630 may adapt the transmission timing of the synchronization beacon based on identified clock drift. Additionally, or alternatively, transmission timing adapter 630 may adapt the transmission timing of the synchronization beacon based on identified data traffic load in at least one communication medium, and suspend transmission of the synchronization beacon associated with the lower-power radio based on the at least one communication medium being overloaded. In some examples, the transmission timing adapter 630 may adapt the transmission timing of the synchronization beacon based on configuration of listen slots. The transmission timing adapter 630 may adapt the transmission timing of the synchronization beacon based on a retransmission rate. In some cases, the synchronization beacon includes a TSF.

Transmission component 635 may cause to transmitter 620 or other components of wireless device 605 to refrain from transmitting one or more instances of the synchronization beacon based on the identified operating condition. Alternatively, transmission component 635 may cause transmitter 620 or wireless device 605 to refrain from transmitting one or more instances of the synchronization beacon based on determining that the periodic data traffic pattern satisfies a threshold value.

The transmission component 635 may coordinate with transmitter 620 or other components of wireless device 605 to transmit the synchronization beacon according to the adapted transmission timing, or refrain from transmitting one or more instances of the synchronization beacon based on determining that that the wakeup radio of the STA is in the active status. In some examples, transmission component 635 may cause transmitter 620 or other components of wireless device 605 to transmit an operating mode indicator to the STA based on the suspending, where the operating mode indicator includes instructions for the STA to monitor transmission of a wakeup message from the AP in an action frame or a HE control field of a data frame, or both. In some cases, the wakeup radio includes a low-power radio.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
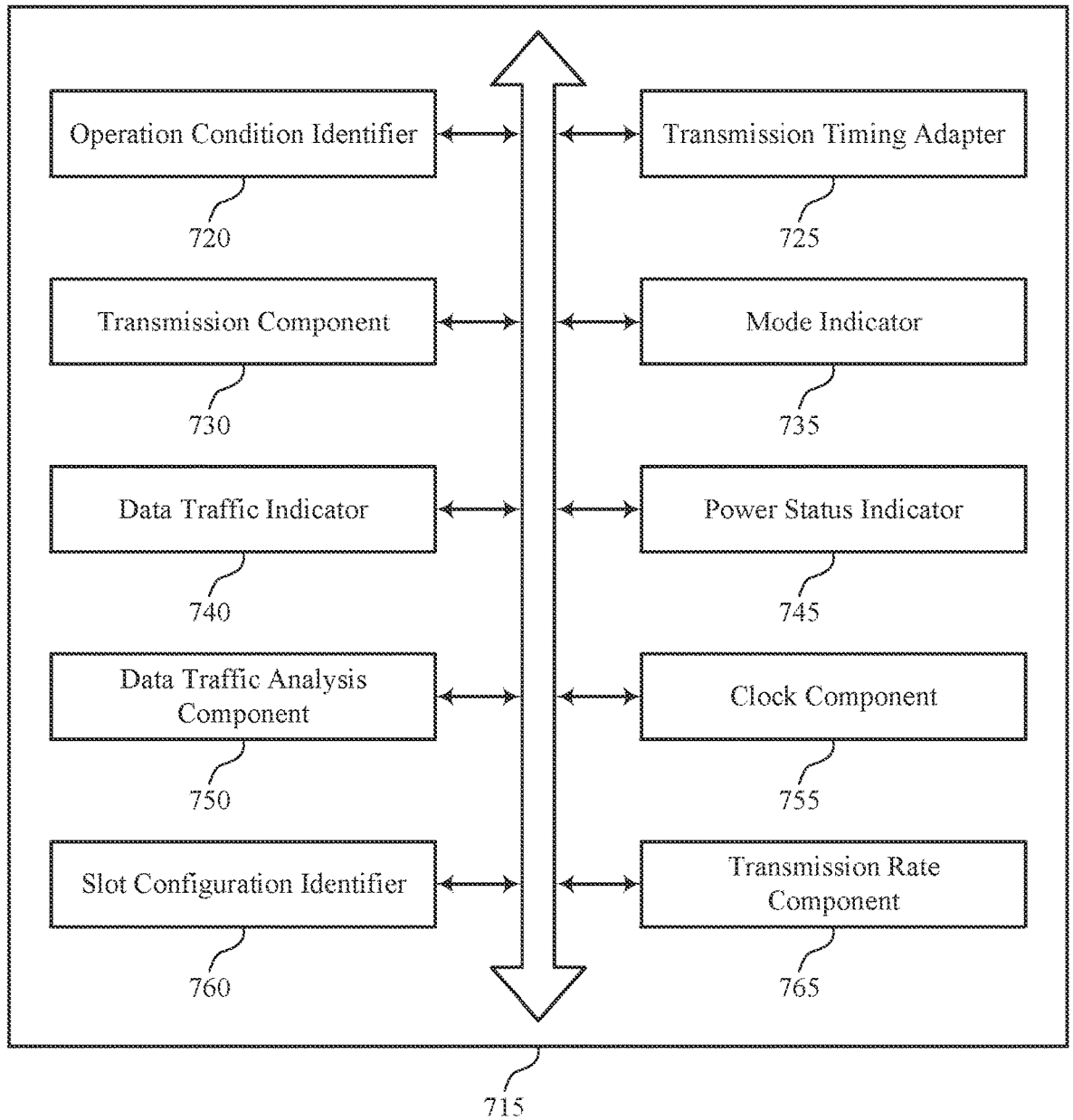
FIG. 7 shows a block diagram of an access point (AP) synchronization beacon manager that supports adaptive transmissions of wakeup radio synchronization beacons in accordance with aspects of the present disclosure.

FIG. 7 shows a block diagram 700 of an AP synchronization beacon manager 715 that supports adaptive transmissions of wakeup radio synchronization beacons in accordance with aspects of the present disclosure. The AP synchronization beacon manager 715 may be an example of aspects of AP synchronization beacon manager 515 or AP synchronization beacon manager 615 as described with reference to FIGS. 5 and 6. The AP synchronization beacon manager 715 may include operation condition identifier 720, transmission timing adapter 725, transmission component 730, mode indicator 735, data traffic indicator 740, power status indicator 745, data traffic analysis component 750, clock component 755, slot configuration identifier 760, and transmission rate component 765. Each of these modules may communicate, directly or indirectly, with one another (e.g., via one or more buses).

Operation condition identifier 720 may identify an operating condition of a STA that includes a primary radio and a wakeup radio. The operation condition identifier 720 may receive a wakeup radio capability indication from the STA. The operation condition of the STA may be identified based on receiving the wakeup radio capability. In some cases, the operation condition identifier may receive, from the STA, an association request message including the wakeup radio capability indication.

Transmission timing adapter 725 may adapt a transmission timing of a synchronization beacon associated with the wakeup radio of the STA based on the identified operating condition. The transmission timing adapter 725 may adapt the transmission timing of the synchronization beacon based on an identified clock drift. Alternatively, the transmission timing adapter 725 may adapt the transmission timing of the synchronization beacon based on identified data traffic load in at least one communication medium. The transmission timing adapter 725 may suspend transmission of the synchronization beacon associated with the lower-power radio based on the at least one communication medium being overloaded. Additionally, or alternatively, the transmission timing adapter 725 may adapt the transmission timing of the synchronization beacon based on configuration of listen slots. In some examples, the transmission timing adapter 725 may adapt the transmission timing of the synchronization beacon based on retransmission rate. In some cases, the synchronization beacon includes a TSF.

Transmission component 730 may cause a device or transmitter to refrain from transmitting one or more instances of the synchronization beacon based on identified operating condition. The transmission component 730 may cause a device or transmitter to refrain from transmitting one or more instances of the synchronization beacon based on determining that the periodic data traffic pattern satisfies the threshold value. In some examples, the transmission component 730 may cause a device or transmitter to transmit the synchronization beacon according to the adapted transmission timing. Alternatively, transmission component 730 may cause a device or transmitter to refrain from transmitting one or more instances of the synchronization beacon based on determining that that the wakeup radio of the STA is in active status.

The transmission component 730 may cause a device or transmitter to transmit an operating mode indicator to the STA based on the suspending. The operating mode indicator may include instructions for the STA to monitor transmission of a wakeup message from the AP in an action frame or a HE control field of a data frame, or both. In some cases, the wakeup radio may include a low-power radio.

Mode indicator 735 may, in combination with a receiver, receive a wakeup radio mode indication from the STA. The operating condition of the STA may be identified based on the wakeup radio mode indication. In some examples, mode indicator 735 may determine that the STA is in a wakeup radio mode based on received wakeup radio mode indication. The transmission timing of a synchronization beacon may be adapted based on determining that the STA is in the wakeup radio mode.

The mode indicator 735 may, in combination with a receiver, receive the wakeup radio mode indication in an action frame or a HE control field of a data frame, or both, from the STA. In some examples, mode indicator 735 may determine that the STA withdrew from a wakeup radio mode based on determining that the data traffic for the STA includes delay sensitive data traffic, and determine that the STA withdrew from a wakeup radio mode based on the received power status indicator. The mode indicator 735 may determine that the wakeup radio of the STA is in an active status.

Data traffic indicator 740 may determine that data traffic for the STA includes delay sensitive data traffic and identify a periodic data traffic pattern associated with the STA. Power status indicator 745 may receive a power status indicator from the STA. Data traffic analysis component 750 may compare the periodic data traffic pattern to a synchronization beacon transmission interval, and determine that the periodic data traffic pattern satisfies a threshold value associated with a wakeup mode of the STA. In some cases, data traffic analysis component 750 may identify data traffic load in at least one communication medium associated with transmission of the synchronization beacon to the STA, and determine whether the at least one communication medium is overloaded based on the identified data traffic.

Clock component 755 may identify a clock drift of the STA. Slot configuration identifier 760 may identify a configuration of listen slots associated with the STA, where the configuration of the listen slots includes a duration of each listen slot. Transmission rate component 765 may identify a retransmission rate associated with transmission of a wakeup signal to the STA, where the retransmission rate is based on an absence of receiving a polling, or an ACK message, or both, from the STA.

Figure 8:
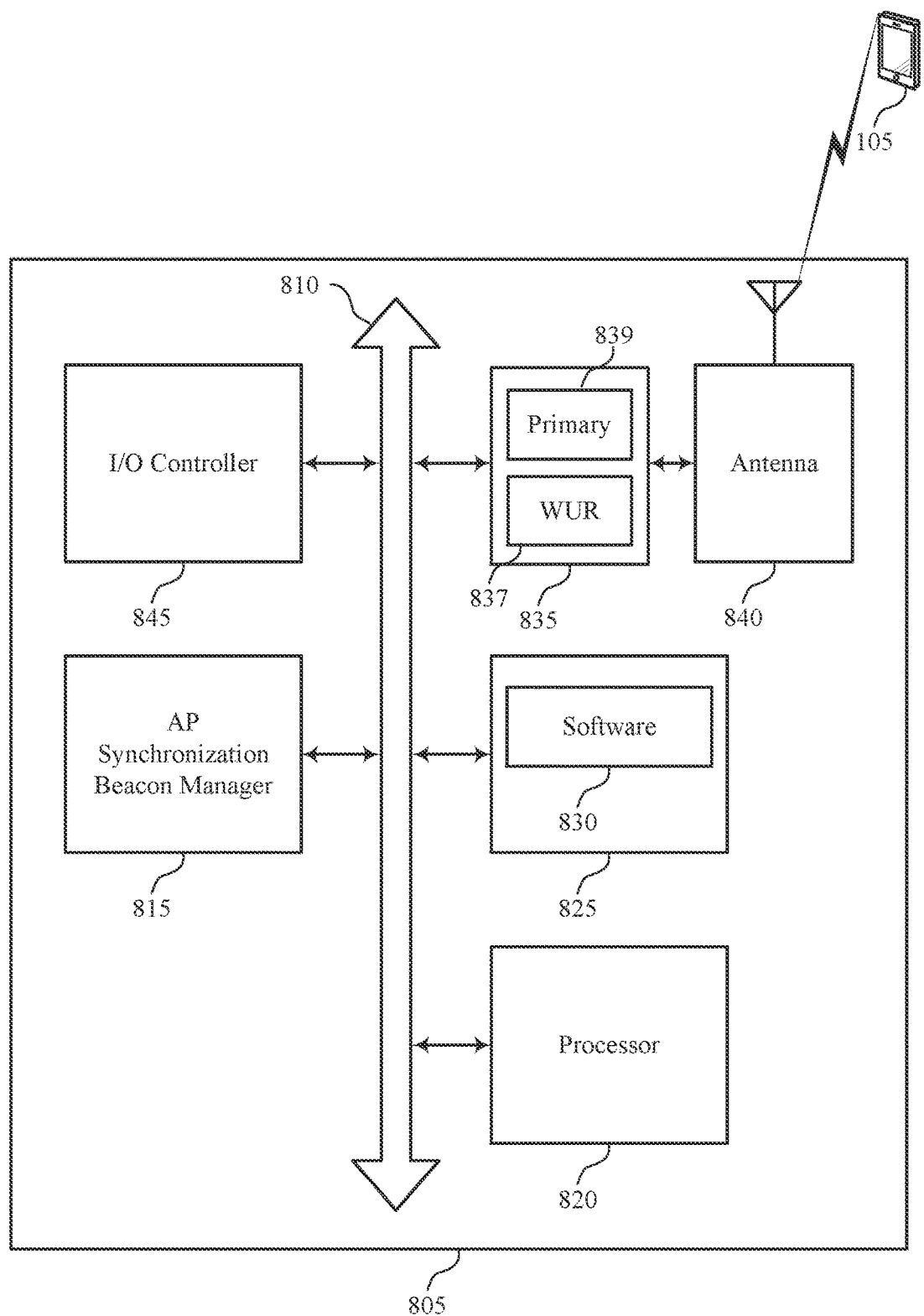
FIG. 8 illustrates a block diagram of a system including a device that supports adaptive transmissions of wakeup radio synchronization beacons in accordance with aspects of the present disclosure.

FIG. 8 shows a block diagram of a system 800 including a device 805 that supports adaptive transmissions of wakeup radio synchronization beacons in accordance with aspects of the present disclosure. Device 805 may be an example of or include the components of wireless device 505, wireless device 605, wireless device 705 or a AP 105 as described herein, e.g., with reference to FIGS. 1 and 5 through 7. Device 805 may include components for bi-directional voice and data communications including components for transmitting and receiving communications, including AP synchronization beacon manager 815, processor 820, memory 825, software 830, transceiver 835, which may include primary radio (or transceiver) 837 and WUR (or low-power radio or transceiver) 839, antenna 840, and I/O controller 845. These components may be in electronic communication via one or more busses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting adaptive transmissions of wakeup radio synchronization beacons).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support adaptive transmissions of wakeup radio synchronization beacons. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described herein. For example, the transceiver 835 may represent a wireless transceiver and may communicate bi-directionally with another wireless transceiver. The transceiver 835 may also include a modem or modems to modulate the packets and provide the modulated packets to the antennas for transmission, and to demodulate packets received from the antennas. Transceiver 835 may include or represent multiple radios, including primary radio 837 and WUR 839, which may be operated as described herein. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
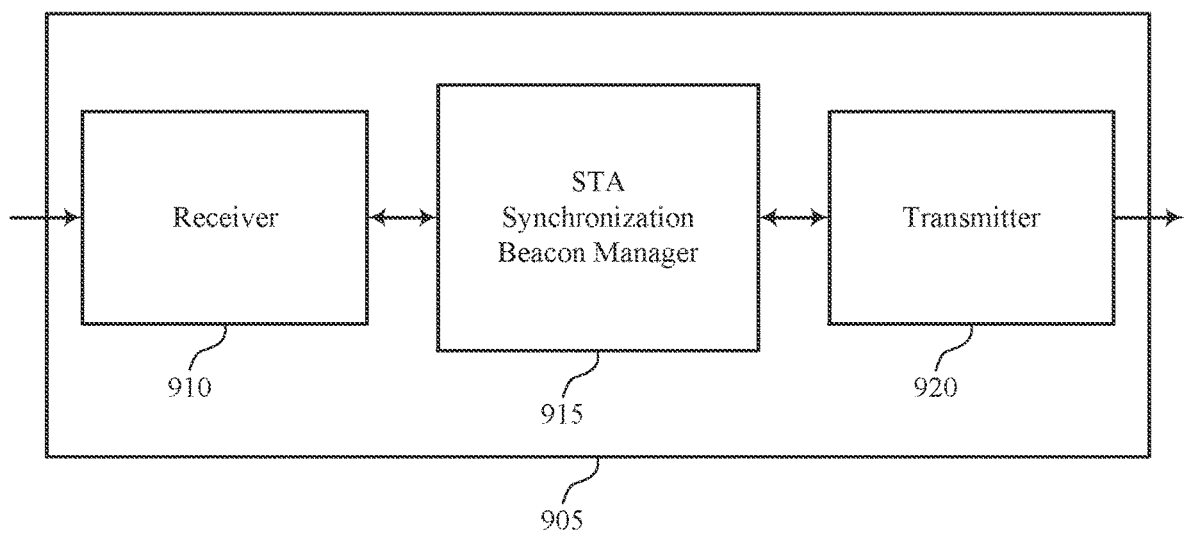
FIGS. 9 through 10 show block diagrams of a device or devices that support adaptive transmissions of wakeup radio synchronization beacons in accordance with aspects of the present disclosure.

FIG. 9 shows a block diagram 900 of a device 905 that supports adaptive transmissions of wakeup radio synchronization beacons in accordance with aspects of the present disclosure. Wireless device 905 may be an example of aspects of a STA 115 as described with reference to FIG. 1. Wireless device 905 may include receiver 910, STA synchronization beacon manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to adaptive transmissions of wakeup radio synchronization beacons, etc.). Information may be passed on to other components of the device. The receiver 910 may be an example of aspects of the transceiver 1235 described with reference to FIG. 12. The receiver 910 may utilize a single antenna or a set of antennas.

STA synchronization beacon manager 915 or at least some of its various sub-components may be implemented in hardware, software executed by a processor, firmware, or any combination thereof. If implemented in software executed by a processor, the functions of the STA synchronization beacon manager 915 or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The STA synchronization beacon manager 915 or at least some of its various sub-components may be physically located at various positions, including being distributed such that portions of functions are implemented at different physical locations by one or more physical devices. In some examples, STA synchronization beacon manager 915 or at least some of its various sub-components may be a separate and distinct component in accordance with various aspects of the present disclosure. In other examples, STA synchronization beacon manager 915 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

STA synchronization beacon manager 915 may identify an operating condition of the STA. In some examples, the STA may include a primary radio and a wakeup radio. The operating condition of the STA may also be based on the metric for the wakeup radio operation. STA synchronization beacon manager 915 may operate the primary radio or the wakeup radio, or both, based on the operating condition and the wakeup radio operation metric.

Transmitter 920 may transmit signals generated by other components of the device. Transmitter 920 may transmit a metric for a wakeup radio operation to an AP, which may be based on identified operating conditions. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
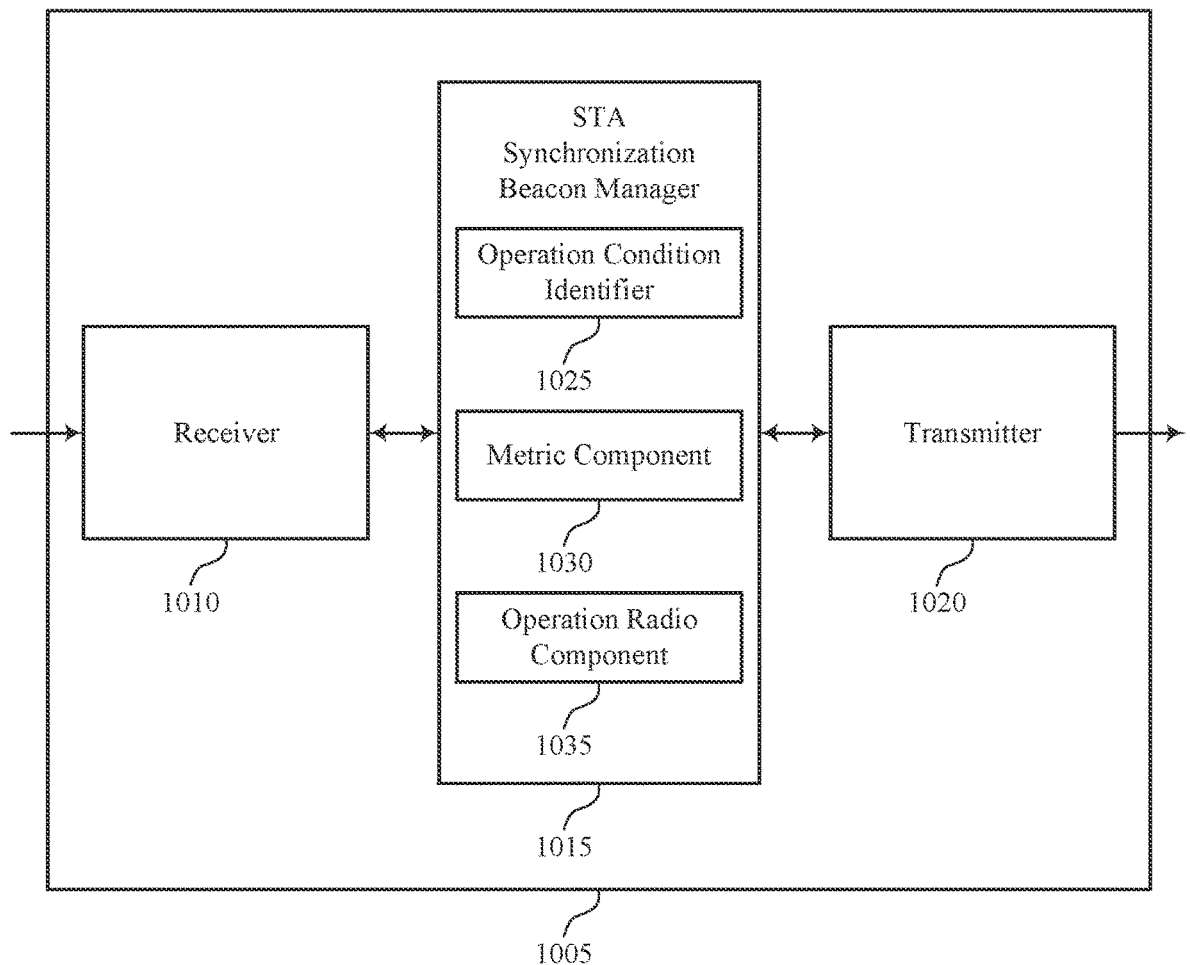

FIG. 10 shows a block diagram 1000 of a device 1005 that supports adaptive transmissions of wakeup radio synchronization beacons in accordance with aspects of the present disclosure. Wireless device 1005 may be an example of aspects of STA 115, STA 215-*a*, STA 215-*b*, STA 215-*c*, STA 315, and STA 415 as described with reference to FIGS. 1 through 4. Wireless device 1005 may include receiver 1010, STA synchronization beacon manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to adaptive transmissions of wakeup radio synchronization beacons, etc.). Information may be passed on to other components of the device. The receiver 1010 may be an example of aspects of the transceiver 1235 described with reference to FIG. 12. The receiver 1010 may utilize a single antenna or a set of antennas.

STA synchronization beacon manager 1015 may be an example of aspects of the STA synchronization beacon manager 915 described with reference to FIG. 9. STA synchronization beacon manager 1015 may also include operation condition identifier 1025, metric component 1030, and operation radio component 1035. Operation condition identifier 1025 may identify an operating condition of a STA (e.g., STA 115). In some examples, the STA may include a primary radio and a wakeup radio. In some cases, the wakeup radio includes a low-power radio.

Metric component 1030 may cause transmitter 920 or other components of device 905 to transmit a metric for a wakeup radio operation to an AP. The operating condition of the STA may be based on the metric for the wakeup radio operation. Operation radio component 1035 may operate the primary radio or the wakeup radio, or both, based on the operating condition and the wakeup radio operation metric.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
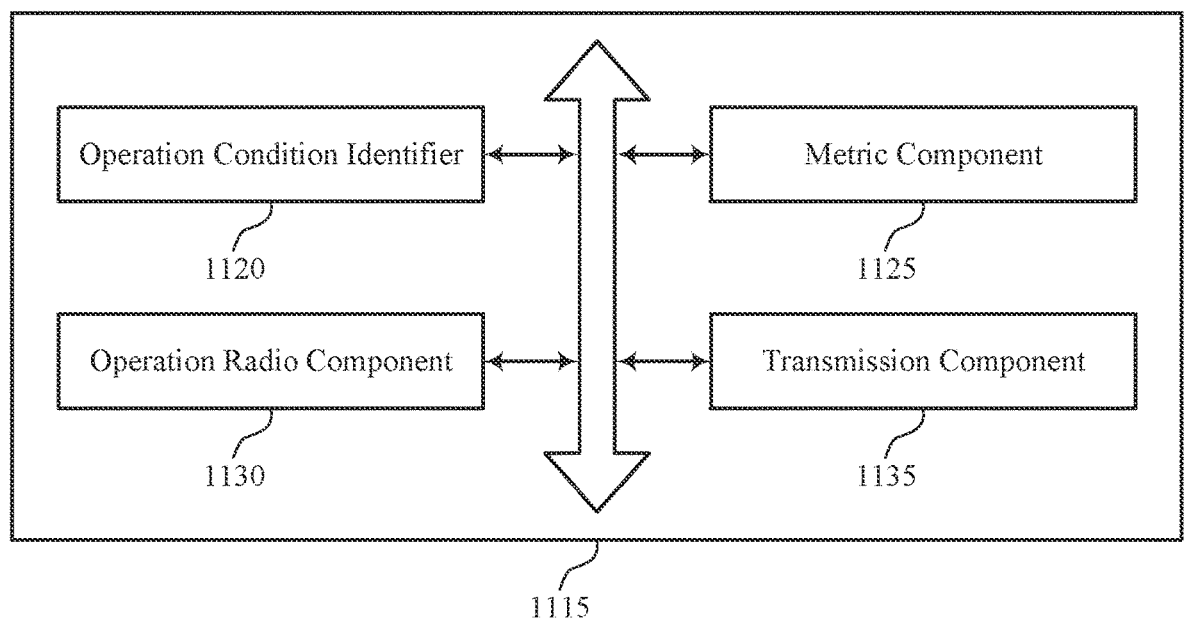
FIG. 11 shows a block diagram of a station (STA) synchronization beacon manager that support adaptive transmissions of wakeup radio synchronization beacons in accordance with aspects of the present disclosure.

FIG. 11 shows a block diagram 1100 of a STA synchronization beacon manager 1115 that supports adaptive transmissions of wakeup radio synchronization beacons in accordance with aspects of the present disclosure. The STA synchronization beacon manager 1115 may be an example of aspects of a STA synchronization beacon manager described with reference to FIGS. 9 and 10. The STA synchronization beacon manager 1115 may include operation condition identifier 1120, metric component 1125, operation radio component 1130, and transmission component 1135. Each of these modules may communicate, directly or indirectly, with one another (e.g., via one or more buses).

Operation condition identifier 1120 may identify an operating condition of a STA. The STA may include a primary radio and a wakeup radio. In some cases, the wakeup radio includes a low-power radio. Metric component 1125 may transmit a metric for a wakeup radio operation to an AP. The operating condition of the STA may be based on the metric for the wakeup radio operation. Operation radio component 1130 may operate the primary radio or the wakeup radio, or both, based on the operating condition and the wakeup radio operation metric.

Transmission component 1135 may cause a device or transmitter to transmit the metric in an action frame or a HE control field of a data frame, or both, from the STA to the AP. In some cases, transmission component 1135 may transmit a power status or battery life indicator from the STA to the AP. Additionally, or alternatively, transmission component 1135 may cause a device or transmitter to transmit an indication of a power mode or a charging mode from the STA to the AP. In some examples, the primary radio or the wakeup radio, or both, are operated based on the power mode.

Transmission component 1135 may also transmit class information of the STA to the AP. The class information may include at least clock drift information associated with the STA. The transmission component 1135 may transmit an indication of a synchronization mode from the STA to the AP, where the primary radio or the wakeup radio, or both, are operated based on the synchronization mode, which may include a configuration or indication the STA is configured to receive synchronization or a preferred method of synchronization.

Figure 12:
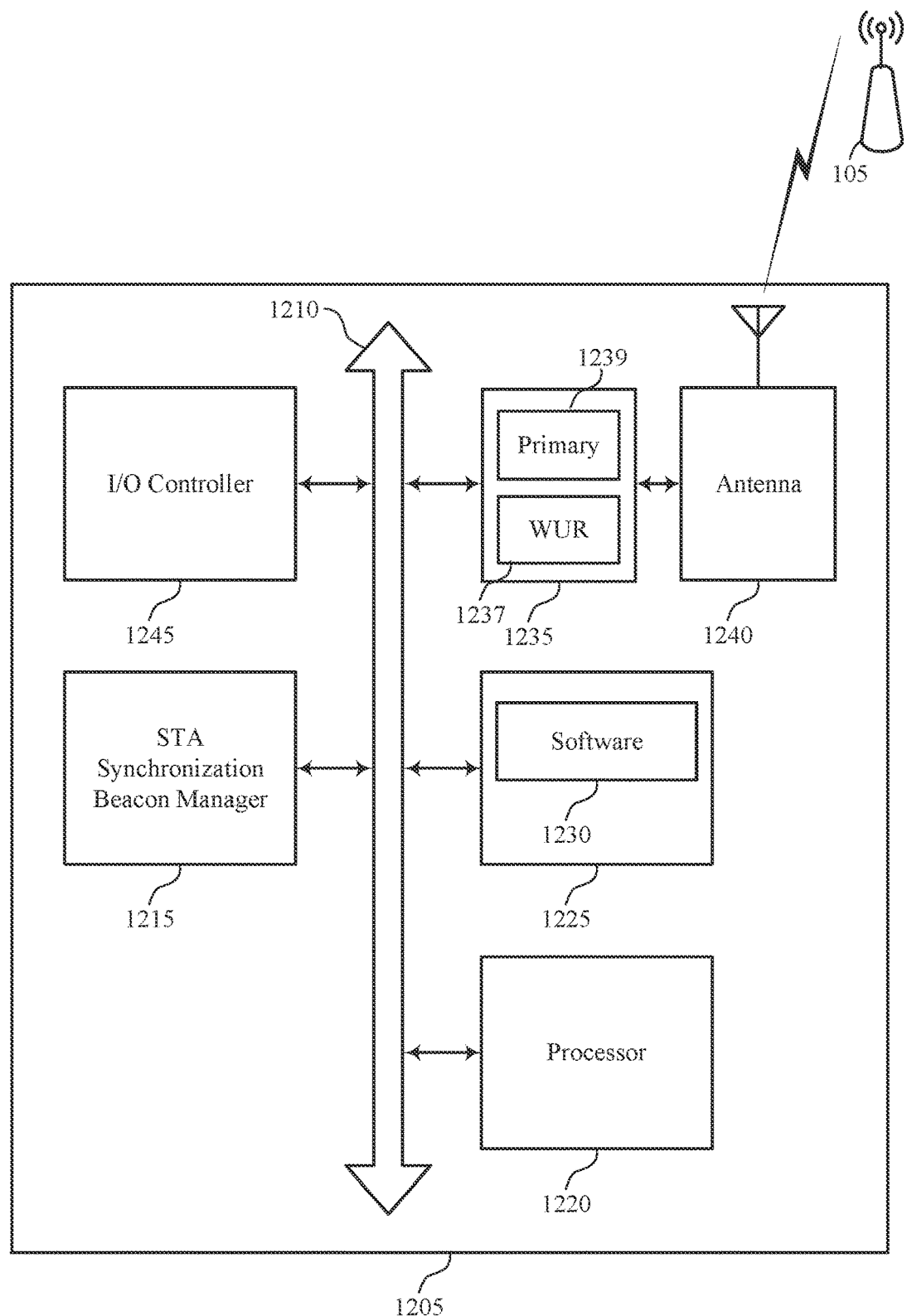
FIG. 12 illustrates a block diagram of a system including a device that supports adaptive transmissions of wakeup radio synchronization beacons in accordance with aspects of the present disclosure.

FIG. 12 shows a block diagram of a system 1200 including a device 1205 that supports adaptive transmissions of wakeup radio synchronization beacons in accordance with aspects of the present disclosure. Device 1205 may be an example of or include the components of STA 115 as described herein, e.g., with reference to FIG. 1. Device 1205 may include components for bi-directional voice and data communications including components for transmitting and receiving communications, including STA synchronization beacon manager 1215, processor 1220, memory 1225, software 1230, transceiver 1235, which may include primary radio (or transceiver) 1237 and WUR (or low-power radio or transceiver) 1239 antenna 1240, and I/O controller 1245. These components may be in electronic communication via one or more busses (e.g., bus 1210).

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting adaptive transmissions of wakeup radio synchronization beacons).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS, which may control basic hardware or software operation such as the interaction with peripheral components or devices.

Software 1230 may include code to implement aspects of the present disclosure, including code to support adaptive transmissions of wakeup radio synchronization beacons. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem or modems to modulate the packets and provide the modulated packets to the antennas for transmission, and to demodulate packets received from the antennas. Transceiver 1235 may include or represent multiple radios, including primary radio 1237 and WUR 1239, which may be operated as described herein. In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 245 may be implemented as part of a processor. In some cases, a user may interact with device 1205 via I/O controller 1245 or via hardware components controlled by I/O controller 1245.

Figure 13:
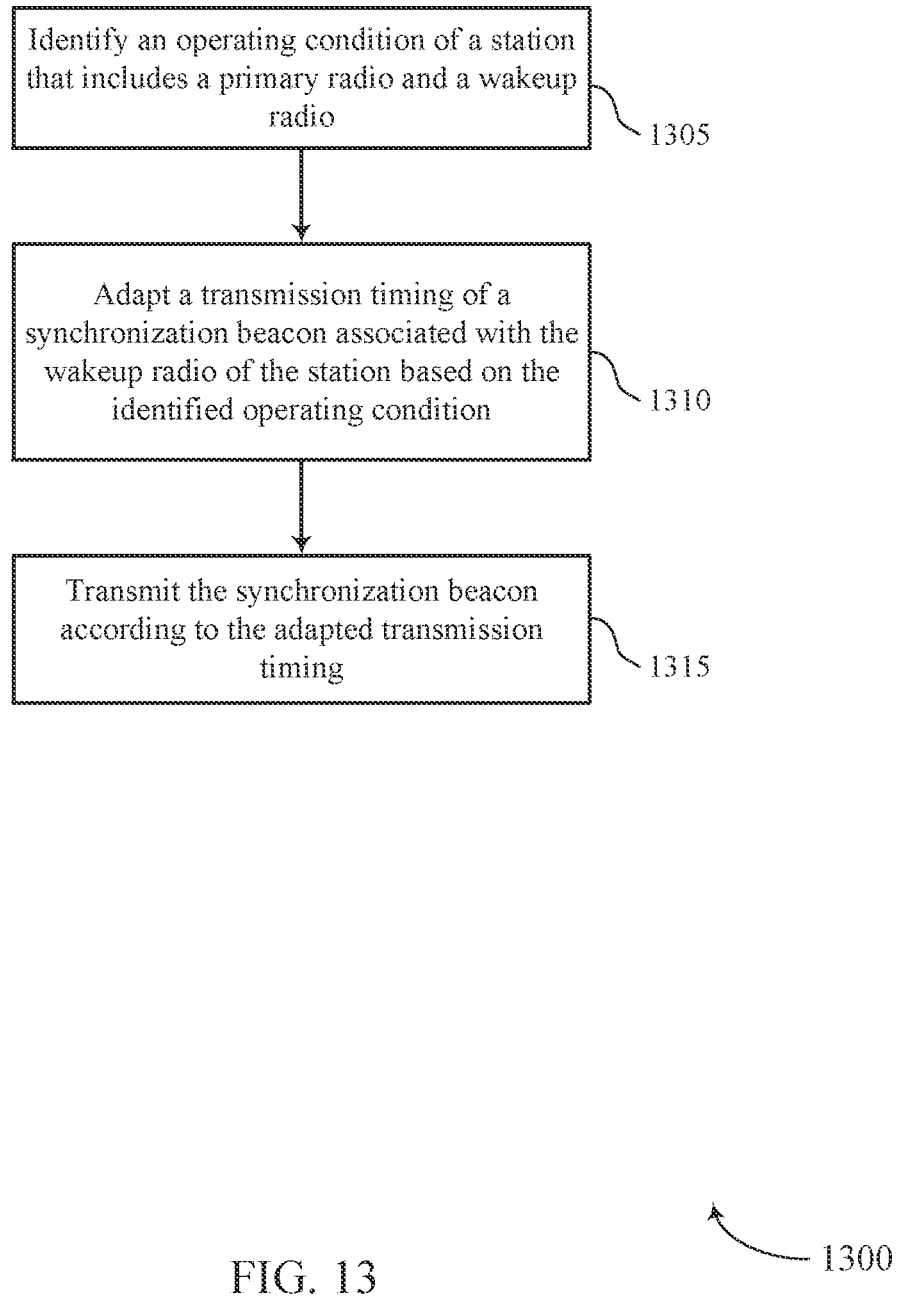
FIGS. 13 through 17 show flowcharts illustrating methods for adaptive transmissions of wakeup radio synchronization beacons in accordance with aspects of the present disclosure.

FIG. 13 shows a flowchart illustrating a method 1300 for adaptive transmissions of wakeup radio synchronization beacons in accordance with aspects of the present disclosure. The operations of method 1300 may be implemented by an AP 105 or its components as described herein. For example, the operations of method 1300 may be performed by an AP synchronization beacon manager as described with reference to FIGS. 5 through 8. In some examples, an AP 105 may execute a set of codes to control the functional elements of the device to perform the functions described herein. Additionally, or alternatively, the AP 105 may perform aspects of the functions described below using special-purpose hardware.

At block 1305 the AP 105 may identify an operating condition of a STA that includes a primary radio and a wakeup radio. The operations of block 1305 may be performed according to the methods described with reference to FIGS. 5 through 8. In certain examples, aspects of the operations of block 1305 may be performed by an operation condition identifier as described with reference to FIGS. 6 and 7.

At block 1310 the AP 105 may adapt a transmission timing of a synchronization beacon associated with the wakeup radio of the STA based on the identified operating condition. The operations of block 1310 may be performed according to the methods described with reference to FIGS. 5 through 8. In certain examples, aspects of the operations of block 1310 may be performed by a transmission timing adapter as described with reference to FIGS. 6 and 7.

At block 1315 the AP 105 may transmit the synchronization beacon according to the adapted transmission timing. The operations of block 1315 may be performed according to the methods described with reference to FIGS. 5 through 8. In certain examples, aspects of the operations of block 1315 may be performed by a transmission component as described with reference to FIGS. 6 and 7.

Figure 14:
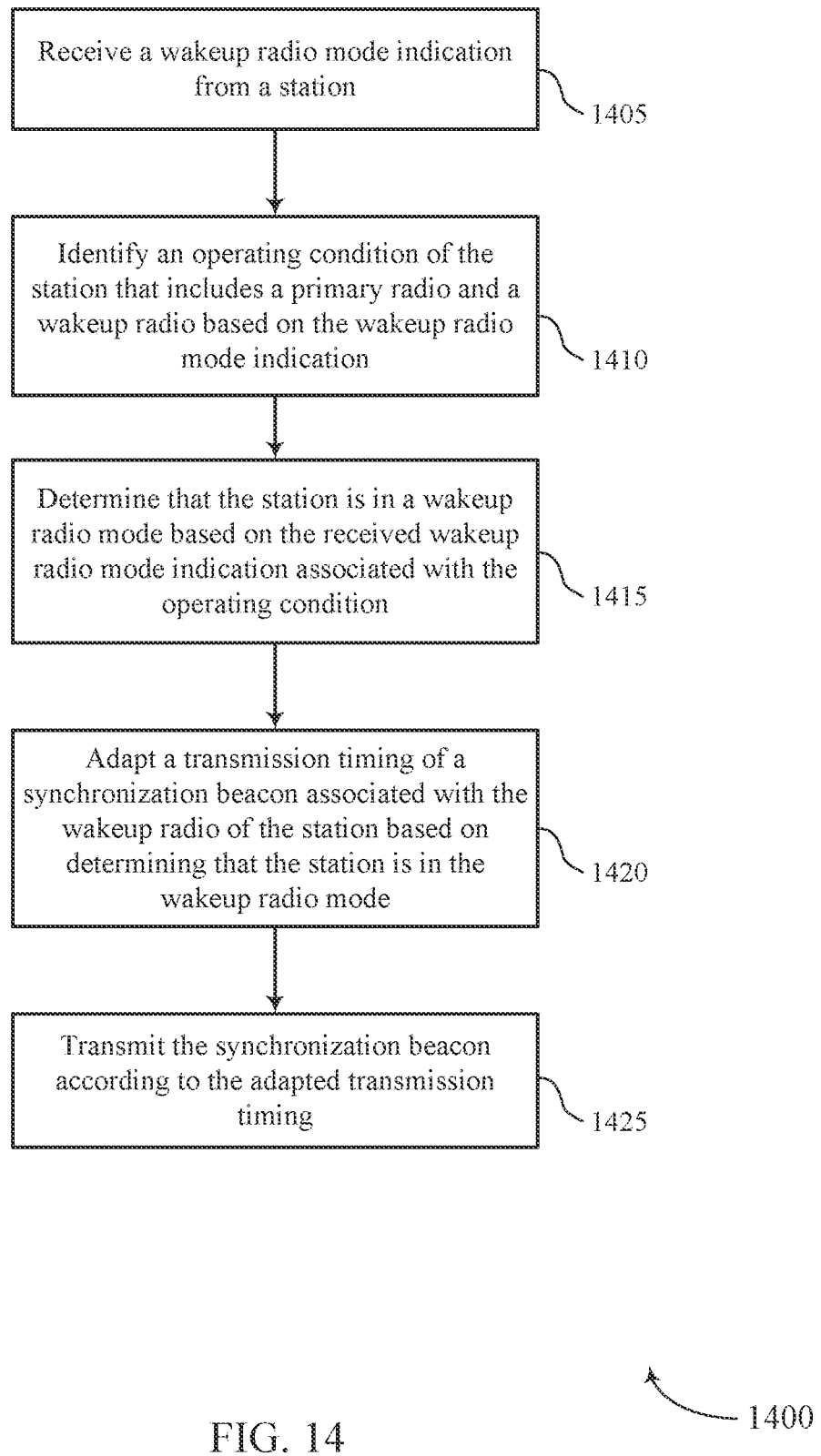

FIG. 14 shows a flowchart illustrating a method 1400 for adaptive transmissions of wakeup radio synchronization beacons in accordance with aspects of the present disclosure. The operations of method 1400 may be implemented by an AP 105 or its components as described herein. For example, the operations of method 1400 may be performed by an AP synchronization beacon manager as described with reference to FIGS. 5 through 8. In some examples, an AP 105 may execute a set of codes to control the functional elements of the device to perform the functions described below. Additionally, or alternatively, the AP 105 may perform aspects of the functions described below using special-purpose hardware.

At block 1405 the AP 105 may receive a wakeup radio mode indication from a STA. The operations of block 1405 may be performed according to the methods described with reference to FIGS. 5 through 8. In certain examples, aspects of the operations of block 1405 may be performed by a mode indicator as described with reference to FIG. 7.

At block 1410 the AP 105 may identify an operating condition of the STA that includes a primary radio and a wakeup radio based on the wakeup radio mode indication. The operations of block 1410 may be performed according to the methods described with reference to FIGS. 5 through 8. In certain examples, aspects of the operations of block 1410 may be performed by an operation condition identifier as described with reference to FIGS. 6 and 7.

At block 1415 the AP 105 may determine that the STA is in a wakeup radio mode based on the received wakeup radio mode indication associated with the operating condition. The operations of block 1415 may be performed according to the methods described with reference to FIGS. 5 through 8. In certain examples, aspects of the operations of block 1415 may be performed by a mode indicator as described with reference to FIG. 7.

At block 1420 the AP 105 may adapt a transmission timing of a synchronization beacon associated with the wakeup radio of the STA based on determining that the STA is in the wakeup radio mode. The operations of block 1420 may be performed according to the methods described with reference to FIGS. 5 through 8. In certain examples, aspects of the operations of block 1420 may be performed by a transmission timing adapter as described with reference to FIGS. 6 and 7.

At block 1425 the AP 105 may transmit the synchronization beacon according to the adapted transmission timing. The operations of block 1425 may be performed according to the methods described with reference to FIGS. 5 through 8. In certain examples, aspects of the operations of block 1425 may be performed by a transmission component as described with reference to FIGS. 6 and 7.

Figure 15:
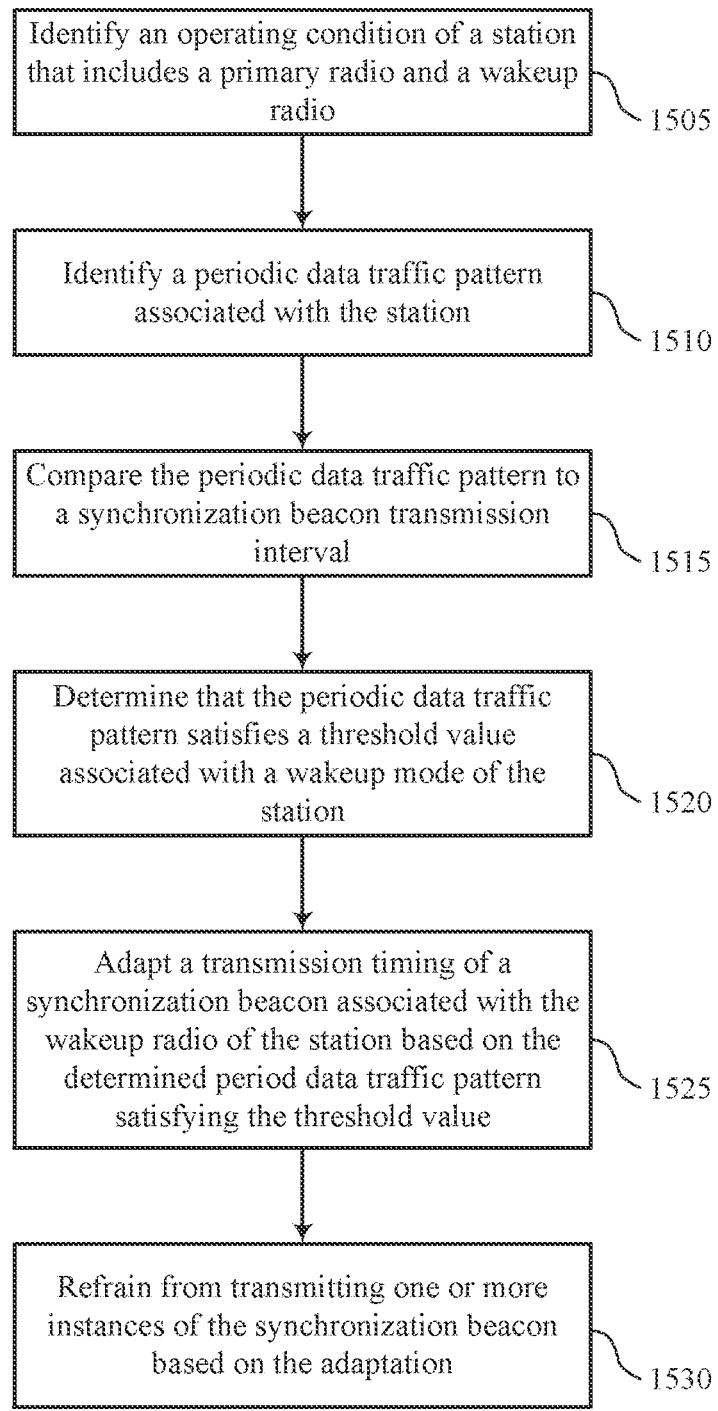

FIG. 15 shows a flowchart illustrating a method 1500 for adaptive transmissions of wakeup radio synchronization beacons in accordance with aspects of the present disclosure. The operations of method 1500 may be implemented by an AP 105 or its components as described herein. For example, the operations of method 1500 may be performed by an AP synchronization beacon manager as described with reference to FIGS. 5 through 8. In some examples, an AP 105 may execute a set of codes to control the functional elements of the device to perform the functions described below. Additionally, or alternatively, the AP 105 may perform aspects of the functions described below using special-purpose hardware.

At block 1505 the AP 105 may identify an operating condition of a STA that includes a primary radio and a wakeup radio. The operations of block 1605 may be performed according to the methods described with reference to FIGS. 5 through 8. In certain examples, aspects of the operations of block 1605 may be performed by an operation condition identifier as described with reference to FIGS. 6 and 7.

At block 1510 the AP 105 may identify a periodic data traffic pattern associated with the STA. The operations of block 150 may be performed according to the methods described with reference to FIGS. 5 through 8. In certain examples, aspects of the operations of block 1510 may be performed by a data traffic indicator as described with reference to FIG. 7

At block 1515 the AP 105 may compare the periodic data traffic pattern to a synchronization beacon transmission interval. The operations of block 1515 may be performed according to the methods described with reference to FIGS. 5 through 8. In certain examples, aspects of the operations of block 1515 may be performed by a data traffic analysis component as described with reference to FIG. 7.

At block 1520 the AP 105 may determine that the periodic data traffic pattern satisfies a threshold value associated with a wakeup mode of the STA. The operations of block 1520 may be performed according to the methods described with reference to FIGS. 5 through 8. In certain examples, aspects of the operations of block 1520 may be performed by a data traffic analysis component as described with reference to FIG. 7.

At block 1525 the AP 105 may adapt a transmission timing of a synchronization beacon associated with the wakeup radio of the STA based on the determined period data traffic pattern satisfying the threshold value. The operations of block 1525 may be performed according to the methods described with reference to FIGS. 5 through 8. In certain examples, aspects of the operations of block 1525 may be performed by a transmission timing adapter as described with reference to FIGS. 6 and 7.

At block 1530 the AP 105 may refrain from transmitting one or more instances of the synchronization beacon based on the adaptation. The operations of block 1530 may be performed according to the methods described with reference to FIGS. 5 through 8. In certain examples, aspects of the operations of block 1530 may be performed by a transmission component as described with reference to FIGS. 6 and 7.

Figure 16:
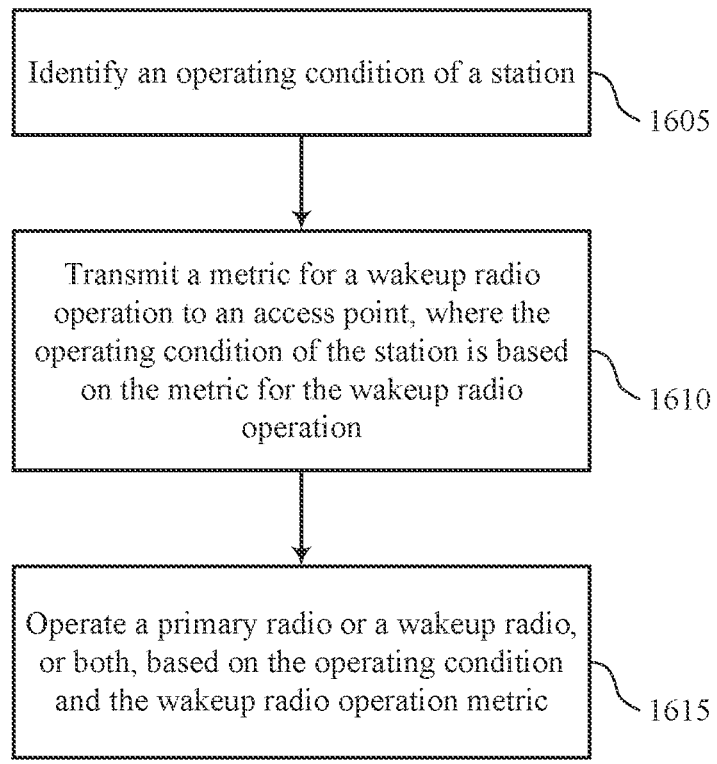

FIG. 16 shows a flowchart illustrating a method 1600 for adaptive transmissions of wakeup radio synchronization beacons in accordance with aspects of the present disclosure. The operations of method 1600 may be implemented by a STA 115 or its components as described herein. For example, the operations of method 1600 may be performed by a STA synchronization beacon manager as described with reference to FIGS. 9 through 12. In some examples, a STA 115 may execute a set of codes to control the functional elements of the device to perform the functions described below. Additionally, or alternatively, the STA 115 may perform aspects of the functions described below using special-purpose hardware.

At block 1605 the STA 115 may identify an operating condition of a STA. In some cases, the STA may include a primary radio and a wakeup radio. The operations of block 1605 may be performed according to the methods described with reference to FIGS. 9 through 12. In certain examples, aspects of the operations of block 1605 may be performed by an operation condition identifier as described with reference to FIGS. 10 and 11.

At block 1610 the STA 115 may transmit a metric for a wakeup radio operation to an AP. The operating condition of the STA may be based on the metric for the wakeup radio operation. The operations of block 1610 may be performed according to the methods described with reference to FIGS. 9 through 12. In certain examples, aspects of the operations of block 1610 may be performed by a metric component as described with reference to FIGS. 10 and 11.

At block 1615 the STA 115 may operate the primary radio or the wakeup radio, or both, based on the operating condition and the wakeup radio operation metric. The operations of block 1615 may be performed according to the methods described with reference to FIGS. 9 through 12. In certain examples, aspects of the operations of block 1615 may be performed by an operation radio component as described with reference to FIGS. 10 and 11.

Figure 17:
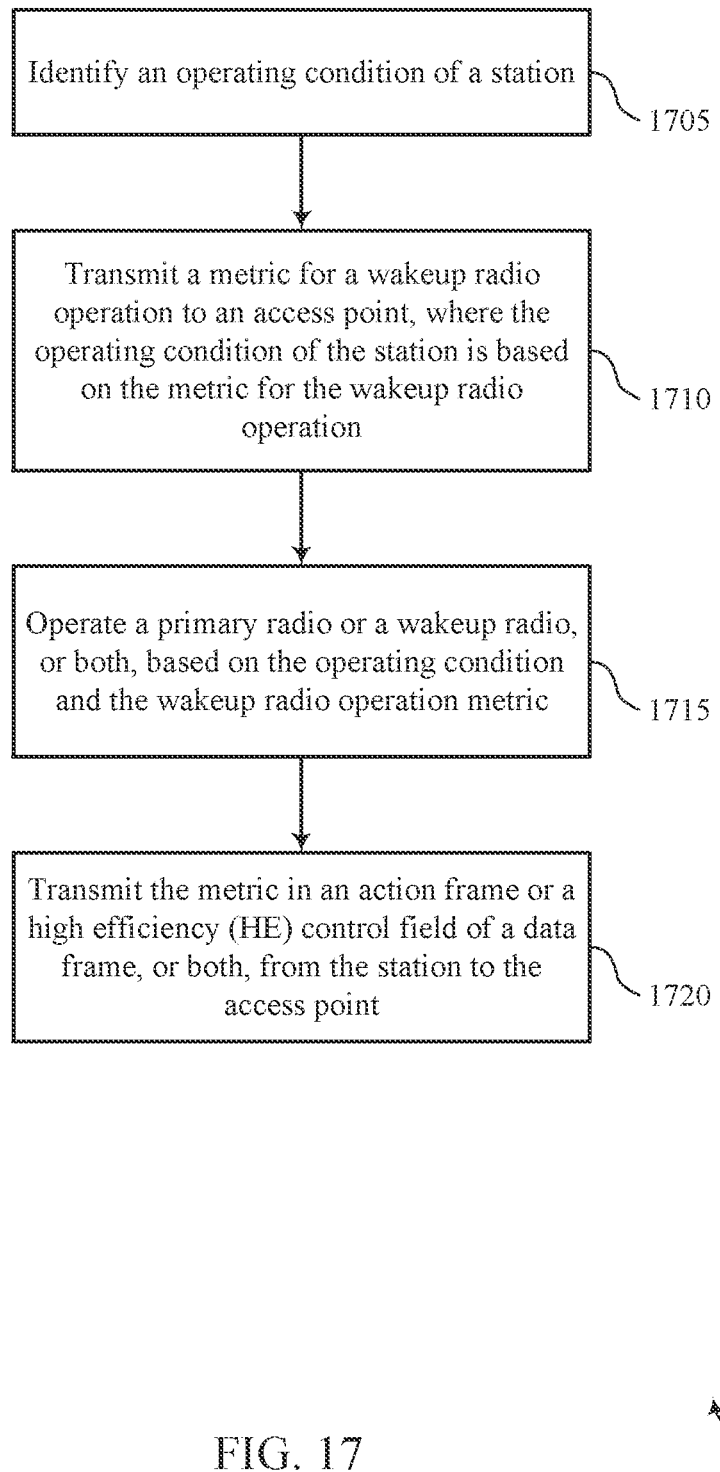

FIG. 17 shows a flowchart illustrating a method 1700 for adaptive transmissions of wakeup radio synchronization beacons in accordance with aspects of the present disclosure. The operations of method 1700 may be implemented by a STA 115 or its components as described herein. For example, the operations of method 1700 may be performed by a STA synchronization beacon manager as described with reference to FIGS. 9 through 12. In some examples, a STA 115 may execute a set of codes to control the functional elements of the device to perform the functions described below. Additionally, or alternatively, the STA 115 may perform aspects of the functions described below using special-purpose hardware.

At block 1705 the STA 115 may identify an operating condition of a STA. In some cases, the STA may include a primary radio and a wakeup radio. The operations of block 1705 may be performed according to the methods described with reference to FIGS. 9 through 12. In certain examples, aspects of the operations of block 1705 may be performed by an operation condition identifier as described with reference to FIGS. 10 and 11.

At block 1710 the STA 115 may transmit a metric for a wakeup radio operation to an AP. In some examples, the operating condition of the STA is based on the metric for the wakeup radio operation. The operations of block 1710 may be performed according to the methods described with reference to FIGS. 9 through 12. In certain examples, aspects of the operations of block 1710 may be performed by a metric component as described with reference to FIGS. 10 and 11.

At block 1715 the STA 115 may operate the primary radio or the wakeup radio, or both, based on the operating condition and the wakeup radio operation metric. The operations of block 1715 may be performed according to the methods described with reference to FIGS. 9 through 12. In certain examples, aspects of the operations of block 1715 may be performed by an operation radio component as described with reference to FIGS. 10 and 11.

At block 1720 the STA 115 may transmit the metric in an action frame or a HE control field of a data frame, or both, from the STA to the AP. The operations of block 1720 may be performed according to the methods described with reference to FIGS. 9 through 12. In certain examples, aspects of the operations of block 1720 may be performed by a transmission component as described with reference to FIG. 11.

In some examples, aspects from two or more of the described methods may be combined. It should be noted that the described methods are just example implementations, and that the operations of the described methods may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the STAs may have similar frame timing, and transmissions from different STAs may be approximately aligned in time. For asynchronous operation, the STAs may have different frame timing, and transmissions from different STAs may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, system 100 and 200 as described with reference to FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described herein can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An access point for wireless communications, comprising:
    one or more processors;
    a memory coupled with the one or more processors; and
    instructions stored in the memory and executable by the one or more processors to cause the access point to:
        receive, from a station that comprises a primary radio and a wakeup radio, an indication of an operating condition, the operating condition associated with a wakeup radio capability of the station; and
        adapt a transmission timing of a series of transmission times for transmitting one or more instances of a synchronization beacon associated with the wakeup radio of the station based at least in part on receipt of the indication of the operating condition, wherein the instructions to adapt the transmission timing cause the access point to, when executed by the processor, refrain from transmitting a first instance of the one or more instances of the synchronization beacon at a first transmission time of the series of transmission times based at least in part on receipt of the indication of the operating condition.

2. The access point of claim 1, wherein the receipt of the indication of the operating condition indicates that each primary radio of each station associated with the access point, including the primary radio of the station, is in an awake state, or that each station associated with the access point, including the station, is not in a wakeup radio mode, or a combination thereof.

3. The access point of claim 1, wherein the transmission timing comprises a periodic transmission pattern, the periodic transmission pattern comprising one or more transmission times separated by a wakeup radio beacon period.

4. The access point of claim 1, wherein the instructions are further executable by the one or more processors to cause the access point to:
 receive a wakeup radio capability indication from the station, wherein the receipt of the indication of the operating condition of the station is identified based at least in part on receiving the wakeup radio capability.

5. The access point of claim 4, wherein the instructions are further executable by the one or more processors to cause the access point to:
 receive, from the station, an association request message comprising the wakeup radio capability indication.

6. The access point of claim 1, wherein the instructions are further executable by the one or more processors to cause the access point to:
 receive a wakeup radio mode indication from the station, wherein the receipt of the indication of the operating condition of the station is identified based at least in part on the wakeup radio mode indication; and
 determine that the station is communicating via the primary radio based at least in part on the received wakeup radio mode indication, wherein the transmission timing is adapted based at least in part on determining that the station is communicating via the primary radio.

7. The access point of claim 6, wherein the instructions to receive the wakeup radio mode indication from the station are further executable by the one or more processors cause the access point to:
 receive the wakeup radio mode indication in an action frame or a high efficiency (HE) control field of a data frame, or both, from the station.

8. The access point of claim 1, wherein the instructions to identify the operating condition of the station are further executable by the one or more processors to cause the access point to:
 determine that data traffic for the station comprises delay sensitive data traffic; and
 determine that the station withdrew from a wakeup radio mode based at least in part on determining that the data traffic for the station comprises the delay sensitive data traffic.

9. The access point of claim 1, wherein the instructions to identify the operating condition of the station are further executable by the one or more processors to cause the access point to:
 receive a power status indicator from the station; and
 determine that the station suspended a wakeup radio mode based at least in part on a received power indication.

10. The access point of claim 1, wherein the instructions to identify the operating condition of the station are further executable by the one or more processors to cause the access point to:
 identify a periodic data traffic pattern associated with the station;
 compare the periodic data traffic pattern to a synchronization beacon transmission interval;
 determine that the periodic data traffic pattern satisfies a threshold value associated with a wakeup mode of the station; and
 refrain from transmitting the first instance of the one or more instances of the synchronization beacon at the first transmission time based at least in part on determining that the periodic data traffic pattern satisfies the threshold value.

11. The access point of claim 1, wherein the instructions to identify the operating condition of the station are further executable by the one or more processors to cause the access point to:
 determine that the primary radio of the station is in an active mode; and
 refrain from transmitting the first instance of the one or more instances of the synchronization beacon at the first transmission time based at least in part on determining that that the primary radio of the station is in the active mode.

12. The access point of claim 1, wherein the synchronization beacon comprises a time synchronization function (TSF).

13. The access point of claim 1, wherein the instructions are further executable by the one or more processors to adapt the transmission timing to cause the access point to:
 identify a clock drift of the station; and
 adapt the transmission timing based at least in part on the identified clock drift.

14. The access point of claim 1, wherein the instructions to adapt the transmission timing are further executable by the one or more processors to cause the access point to:
 identify data traffic load in at least one communication medium associated with transmission of at least a third instance of the one or more instances of the synchronization beacon to the station; and
 adapt the transmission timing based at least in part on the identified data traffic load in the at least one communication medium.

15. The access point of claim 14, wherein the instructions are further executable by the one or more processors to cause the access point to:
 determine whether the at least one communication medium is overloaded based at least in part on the identified data traffic;
 suspend transmission of the one or more instances of the synchronization beacon based at least in part on the at least one communication medium being overloaded; and
 transmit an operating mode indicator to the station based at least in part on the suspending, wherein the operating mode indicator comprises instructions for the station to monitor transmission of a wakeup message from the access point in an action frame or a high efficiency (HE) control field of a data frame, or both.

16. The access point of claim 1, wherein the instructions to adapt the transmission timing are further executable by the one or more processors to cause the access point to:
 identify a configuration of listen slots associated with the station, wherein the configuration of the listen slots comprises a duration of each listen slot; and
 adapt the transmission timing based at least in part on the configuration of the listen slots.

17. The access point of claim 1, wherein the instructions to adapt the transmission timing are further executable by the one or more processors to cause the access point to:
 identify a retransmission rate associated with transmission of a wakeup signal to the station, wherein the retransmission rate is based at least in part on an absence of receiving a polling, or an acknowledgment (ACK) message, or both, from the station; and
 adapt the transmission timing based at least in part on the retransmission rate.

18. The access point of claim 1, wherein the wakeup radio comprises a low-power radio.

19. The access point of claim 1, wherein refraining from transmitting a first instance of the one or more instances of the synchronization beacon is based at least in part on the access point not providing wakeup radio service to any station associated with the access point, including the station.

20. A method for wireless communications at an access point, comprising:
- receiving, from a station that comprises a primary radio and a wakeup radio, an indication of an operating condition, the operating condition associated with a wakeup radio capability of the station; and
- adapting a transmission timing of a series of transmission times for transmitting one or more instances of a synchronization beacon associated with the wakeup radio of the station based at least in part on receipt of the indication of the operating condition, wherein adapting the transmission timing comprises refraining from transmitting a first instance of the one or more instances of the synchronization beacon at a first transmission time of the series of transmission times based at least in part on the operating condition.

21. The method of claim 19, wherein the receipt of the indication of the operating condition indicates each primary radio of each station associated with the access point, including the primary radio of the station, is in an awake state, or that each station associated with the access point, including the station, is not in a wakeup radio mode, or a combination thereof.

22. The method of claim 19, wherein the transmission timing comprises a periodic transmission pattern, the periodic transmission pattern comprising one or more transmission times separated by a wakeup radio beacon period.

23. The method of claim 20, further comprising:
- receiving a wakeup radio capability indication from the station, wherein the receipt of the indication of the operating condition of the station is identified based at least in part on receiving the wakeup radio capability.

24. The method of claim 23, further comprising:
- receiving, from the station, an association request message comprising the wakeup radio capability indication.

25. The method of claim 20, further comprising:
- receiving a wakeup radio mode indication from the station, wherein the receipt of the indication of the operating condition of the station is identified based at least in part on the wakeup radio mode indication; and
- determining that the station is communicating via the primary radio based at least in part on the received wakeup radio mode indication, wherein the transmission timing is adapted based at least in part on determining that the station is communicating via the primary radio.

26. The method of claim 25, wherein receiving the wakeup radio mode indication from the station comprises:
- receiving the wakeup radio mode indication in an action frame or a high efficiency (HE) control field of a data frame, or both, from the station.

27. The method of claim 20, wherein identifying the operating condition of the station comprises:
- determining that data traffic for the station comprises delay sensitive data traffic; and
- determining that the station withdrew from a wakeup radio mode based at least in part on determining that the data traffic for the station comprises delay sensitive data traffic.

28. The method of claim 20, wherein identifying the operating condition of the station comprises:
- receiving a power status indicator from the station; and
- determining that the station withdrew from a wakeup radio mode based at least in part on the received power status indicator.

29. An apparatus for wireless communication, comprising:
- means for receiving, from a station that comprises a primary radio and a wakeup radio, an indication of an operating condition, the operating condition associated with a wakeup radio capability of the station; and
- means for adapting a transmission timing of a series of transmission times for transmitting one or more instances of a synchronization beacon associated with the wakeup radio of the station based at least in part on receipt of the indication of the operating condition, wherein adapting the transmission timing comprises refraining from transmitting a first instance of the one or more instances of the synchronization beacon at a first transmission time of the series of transmission times based at least in part on the receipt of the indication of the operating condition.

30. A non-transitory computer readable medium storing code for wireless communication, the code comprising instructions executable by a processor of an access point to:
- receive, from a station that comprises a primary radio and a wakeup radio, an indication of an operating condition, the operating condition associated with a wakeup radio capability of the station; and
- adapt a transmission timing of a series of transmission times for transmitting one or more instances of a synchronization beacon associated with the wakeup radio of the station based at least in part on receipt of the indication of the operating condition, wherein the instructions to adapt the transmission timing are further executable to cause the access point to refrain from transmitting a first instance of the one or more instances of the synchronization beacon at a first transmission time of the series of transmission times based at least in part on the receipt of the indication of the operating condition.

* * * * *